(12) United States Patent
Meaige et al.

(10) Patent No.: US 9,033,404 B2
(45) Date of Patent: May 19, 2015

(54) ENCAPSULATED ALUMINUM HONEYCOMB STRUCTURAL STIFFENER

(71) Applicant: Honda Motor Co., Ltd., Tokyo (JP)

(72) Inventors: Ben Meaige, Dublin, OH (US); Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 13/828,501

(22) Filed: Mar. 14, 2013

(65) Prior Publication Data

US 2014/0265443 A1 Sep. 18, 2014

(51) Int. Cl.
*B62D 29/00* (2006.01)
*B62D 25/02* (2006.01)

(52) U.S. Cl.
CPC ............ *B62D 29/002* (2013.01); *B62D 25/025* (2013.01)

(58) Field of Classification Search
USPC ............................ 296/187.02, 193.05, 203.03
See application file for complete search history.

(56) References Cited

U.S. PATENT DOCUMENTS

| | | | |
|---|---|---|---|
| 6,247,287 B1 * | 6/2001 | Takabatake | ...................... 52/843 |
| 6,419,305 B1 | 7/2002 | Larsen | |
| 6,550,847 B2 | 4/2003 | Honda et al. | |
| 6,619,727 B1 | 9/2003 | Barz et al. | |
| 6,729,425 B2 | 5/2004 | Schneider et al. | |
| 6,777,049 B2 | 8/2004 | Sheon et al. | |
| 6,793,274 B2 | 9/2004 | Riley et al. | |
| 6,941,719 B2 | 9/2005 | Busseuil et al. | |
| 7,105,112 B2 | 9/2006 | Czaplicki et al. | |
| 7,597,382 B2 * | 10/2009 | Vilcek et al. | .............. 296/187.02 |
| 2007/0101679 A1 | 5/2007 | Harthcock et al. | |
| 2009/0167055 A1 * | 7/2009 | Niezur et al. | ............ 296/187.02 |

FOREIGN PATENT DOCUMENTS

| | | |
|---|---|---|
| DE | 10032556 | 1/2002 |
| DE | 102007025930 | 12/2008 |
| EP | 1759959 | 9/2009 |

OTHER PUBLICATIONS

Search Report of DE Serial No. 102014203722.0 dated Dec. 15, 2014, 10 pages.
Search Report of DE Serial No. 102014203722.0 dated Dec. 15, 2014, 7 pages (English Translation).

* cited by examiner

*Primary Examiner* — Joseph D Pape
(74) *Attorney, Agent, or Firm* — Rankin, Hill & Clark LLP

(57) ABSTRACT

A vehicle body includes a hollow structural member having an inner surface. The hollow structural member includes a first metal or metal alloy. A structural reinforcement member is positioned in the hollow structural member and includes a stiffener including a second metal or metal alloy different from the first metal or metal alloy. A gap is provided between the stiffener and the inner surface of the structural member. An adhesive is secured to the stiffener. The adhesive is substantially dry to the touch prior to activation and is activatable to expand toward the inner surface to fill at least a portion of the gap. A frame is secured to the stiffener and is positioned between the stiffener and the inner surface of the structural member to maintain the gap prior to expansion of the adhesive. The frame is adapted to insulate the stiffener from the hollow structural member.

20 Claims, 28 Drawing Sheets

ENCAPSULATED ALUMINUM HONEYCOMB STRUCTURAL STIFFENER

BACKGROUND

The trends in vehicle design are towards lighter vehicles to improve fuel consumption. At the same time, manufacturers continue to demand more rigorous structural performance standards. The use of lighter hollow cross-sectional members that are used to form a vehicle body has lead to the need for additional reinforcement in various locations in the vehicle body. As is well known, the vehicle body generally undergoes an electrocoat process in which the vehicle body is passed through a bath of anticorrosion fluid whereby an anticorrosion coating is deposited onto the vehicle body by electrolysis. The vehicle body is subsequently heated to bake the coating on the metal. Therefore, it is desirable for that the reinforcement does not prevent the provision of the anticorrosion coating on the inner surface of the hollow member by the electrocoat process.

It is known to provide longitudinal reinforcing structures within the hollow cross-sectional members of the vehicle body. The structure is typically provided with an expandable adhesive on two surfaces, which can be foamed upon heating to bond the beam to two opposed walls of the hollow member. However, this technique is not suitable for use in the electrocoat process described above as it can prevent the proper electrocoat over the entire surface, which can lead to local areas of corrosion. Another known reinforcement includes an aluminum honeycomb for its light weight and high strength. However, it is difficult to isolate the aluminum from the steel hollow member, to correctly position the reinforcement inside the hollow member, and to prevent the anti-corrosion fluid from filling the honeycomb and adding weight. It is also known to provide foamable plastic moldings within the hollow members which can be foamed upon application of heat, such as is provided by the baking step in the electrocoat process, to provide a foamed baffle that fills the cross-section to provide sound adsorption. These inserts can be used to provide acoustic baffles and seals.

BRIEF DESCRIPTION

In accordance with one aspect, a vehicle body comprises a hollow structural member having an inner surface. The hollow structural member includes a first metal or metal alloy. A structural reinforcement member is positioned in the hollow structural member. The structural reinforcement member includes a stiffener including a second metal or metal alloy different from the first metal or metal alloy. A gap is provided between the stiffener and the inner surface of the hollow structural member. An adhesive is secured to the stiffener. The adhesive is substantially dry to the touch prior to activation and is activatable to expand toward the inner surface to fill at least a portion of the gap. A frame is secured to the stiffener and is positioned between the stiffener and the inner surface of the hollow structural member to maintain the gap prior to expansion of the adhesive. The frame is adapted to insulate the stiffener from the hollow structural member.

In accordance with another aspect, a structural reinforcement member for a vehicle body including a hollow structural member having an inner surface comprises a stiffener insertable in the hollow structural member with a gap between the stiffener and the inner surface. The stiffener includes a honeycomb structure having a plurality of openings. The stiffener is positioned in the hollow structural member so that the openings are oriented substantially normal to a longitudinal axis of the hollow structural member. An adhesive is secured directly to the stiffener and positioned to close opposite open ends of the plurality of openings of the honeycomb structure. The adhesive is substantially dry to the touch prior to activation and is activatable to expand toward the inner surface to fill at least a portion of the gap. A frame is secured to the stiffener and positioned between the stiffener and the inner surface of the hollow structural member to maintain the gap prior to expansion of the adhesive. A portion of the frame is configured to substantially conform to the shape of the inner surface of the hollow structural member.

In accordance with yet another aspect, a method of reinforcing a hollow structural member of a vehicle comprises providing a stiffener including a honeycomb structure having a plurality of openings; securing an adhesive to the stiffener, the adhesive activatable to expand outward from the stiffener to engage a portion of an interior surface of the hollow structural member; securing a frame to the stiffener, a portion of the frame is configured to substantially conform to the shape of the inner surface of the hollow structural member; inserting the stiffener together with the frame in the hollow structural member; and providing a gap between the adhesive and the inner surface of the hollow structural member prior to activation of the adhesive.

DETAILED DESCRIPTION

It should, of course, be understood that the description and drawings herein are merely illustrative and that various modifications and changes can be made in the structures disclosed without departing from the present disclosure. In general, the figures of the exemplary structural reinforcement member are not to scale. It will also be appreciated that the various identified components of the exemplary structural reinforcement member disclosed herein are merely terms of art that may vary from one manufacturer to another and should not be deemed to limit the present disclosure.

Figure 1:
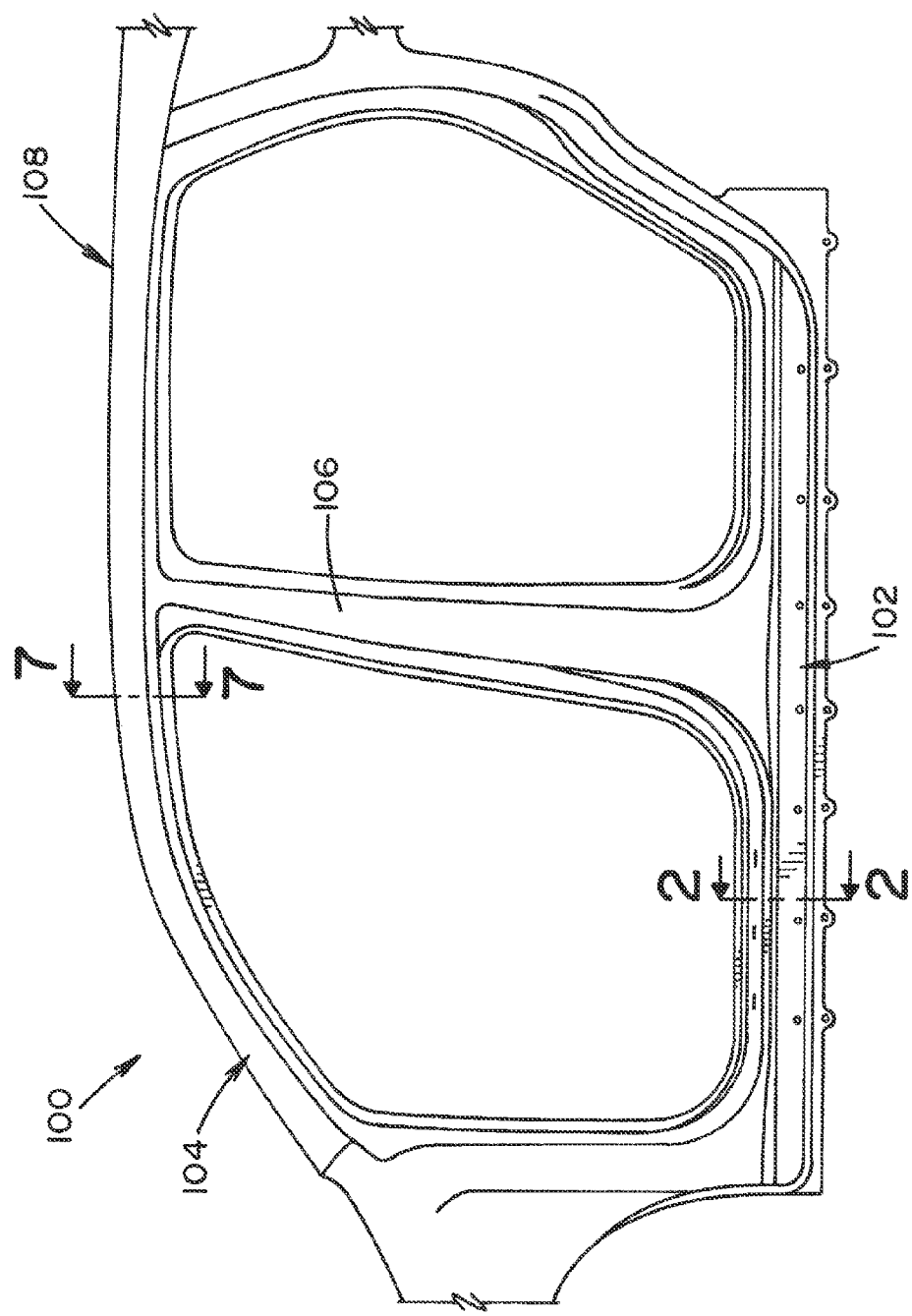
FIG. 1 is a schematic view of a portion of a vehicle body.

Referring now to the drawings, wherein like numerals refer to like parts throughout the several views, FIG. 1 illustrates a portion of a vehicle body 100. The portion of the vehicle body 100 is formed of generally hollow structural members, such as a side sill 102, an A-pillar 104 and a B-pillar 106, that are joined together to define a frame 108. Each of the structural members 102, 104, 106 can be reinforced with an exemplary structural reinforcement member by locating the reinforcement member in a hollow or cavity portion of the structural member as will be described in greater detail below. The structural reinforcement member is adapted such that when properly positioned in the structural member 102, 104, the reinforcement member does not prevent the provision of the anticorrosion coating on the inner surface of the hollow structural member 102, 104 by an electrocoat process.

Figure 2:
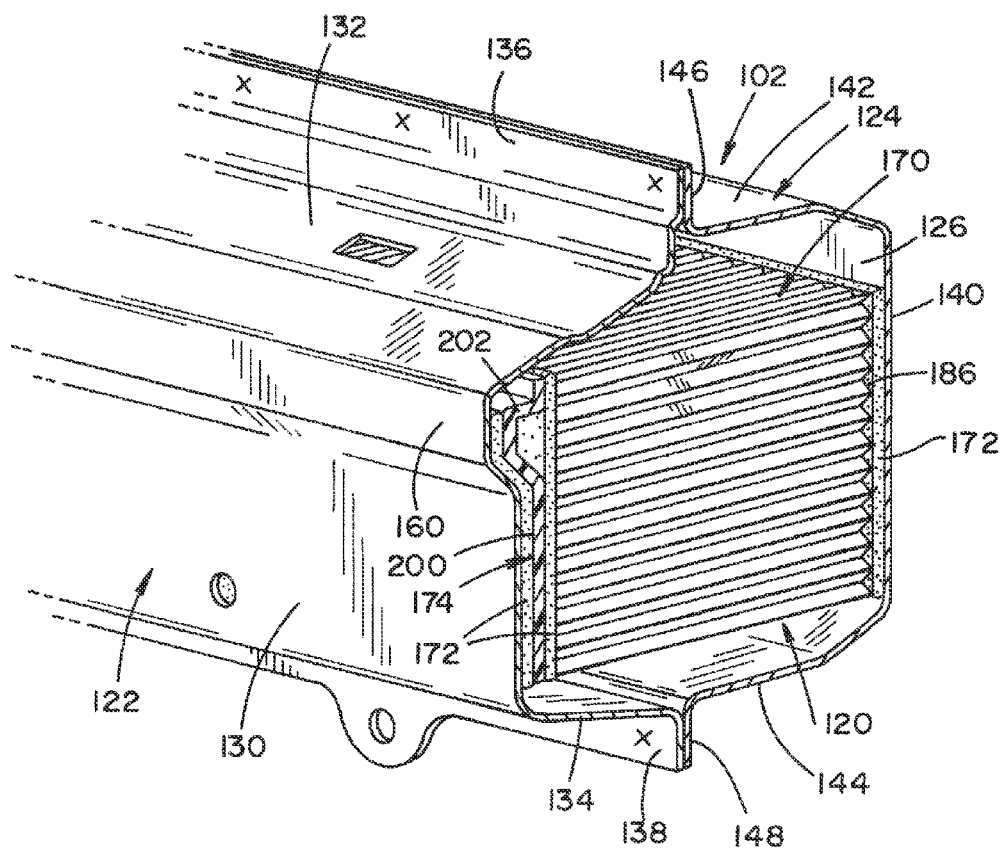
FIG. 2 is a cross-sectional perspective view of one aspect of a first structural member of the vehicle body portion of FIG. 1 taken along line 2-2 of FIG. 1, the first structural member including an exemplary reinforcement member according to first embodiment of the present disclosure.
Figure 3:
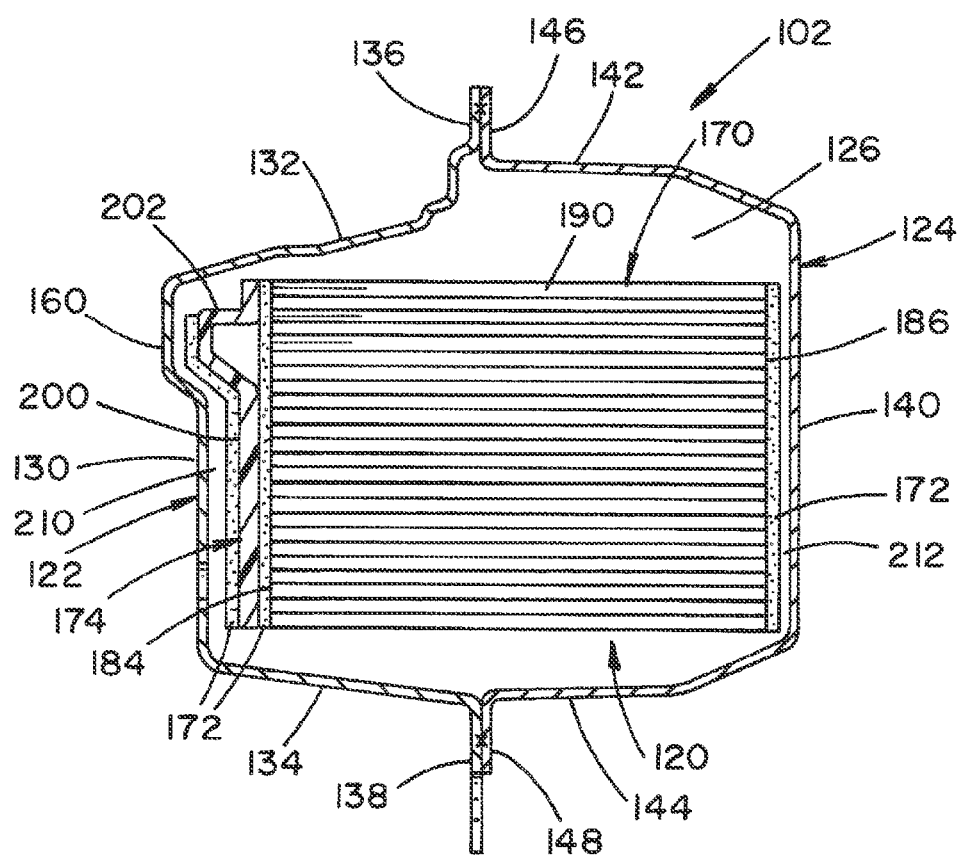
FIG. 3 depicts the structural reinforcement member of FIG. 2 prior to attachment to the first structural member.
Figure 4:
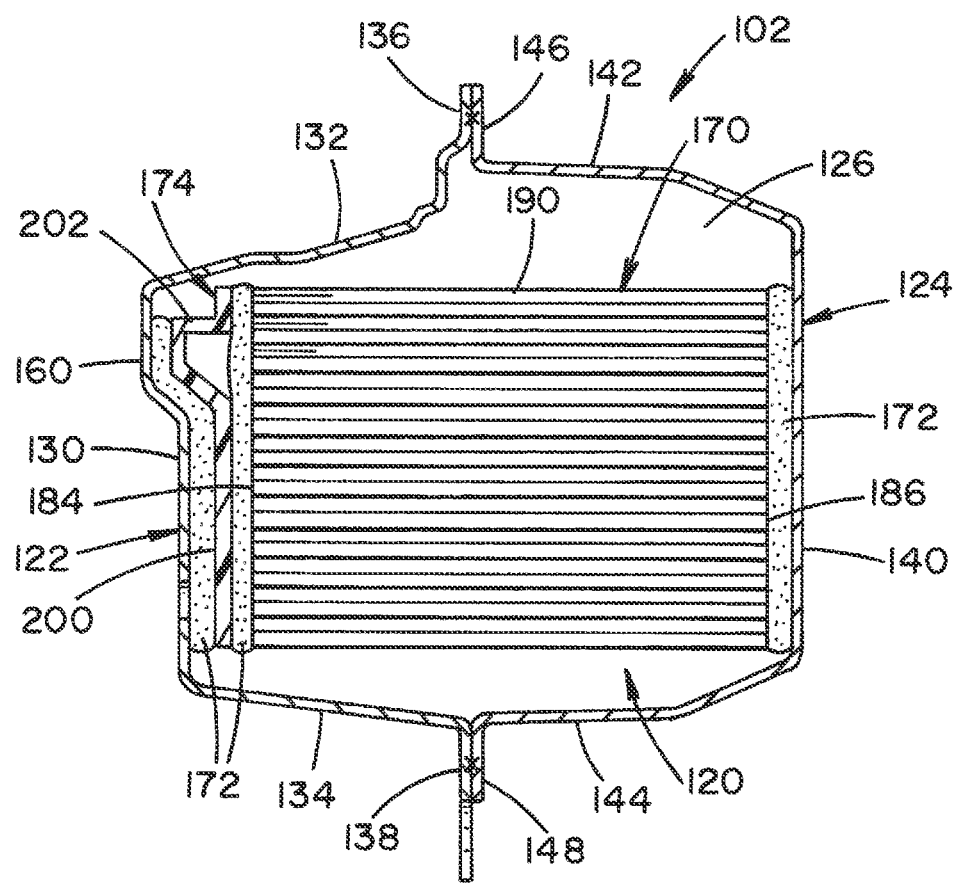
FIG. 4 depicts the structural reinforcement member of FIG. 2 fixedly attached to the first structural member.

FIGS. 2-4 depict the exemplary structural member or side sill 102 having an exemplary reinforcement member 120 located therein. The structural member or side sill 102 can be formed of an outer panel member 122 joined to an inner panel member 124, the inner and outer panel members 122, 124 defining an elongated cavity 126. The inner panel member 122 includes a sidewall 130, a top wall 132 and a bottom wall 134. A flange 136 extends outwardly from an end portion of the top wall 132 and a flange 138 extends outwardly from an end portion of the bottom wall 134. Similarly, the inner panel member 124 includes a sidewall 140, a top wall 142, and a bottom wall 144. A flange 146 extends outwardly from an end portion of the top wall 142, and a flange 148 extends outwardly from an end portion of the bottom wall 144. The flanges 136, 138 of the outer panel member 122 are fixedly attached (e.g., by welding) to the corresponding flanges 146, 148 of the inner panel member 124. As depicted, the exemplary side sill 102 further includes a longitudinally extending channel 160 which can be defined in the sidewall 130 of the outer panel member 122. The structural member or side sill 102 includes a first metal or a metal alloy, and can be formed of a steel or steel alloy.

Figure 5:
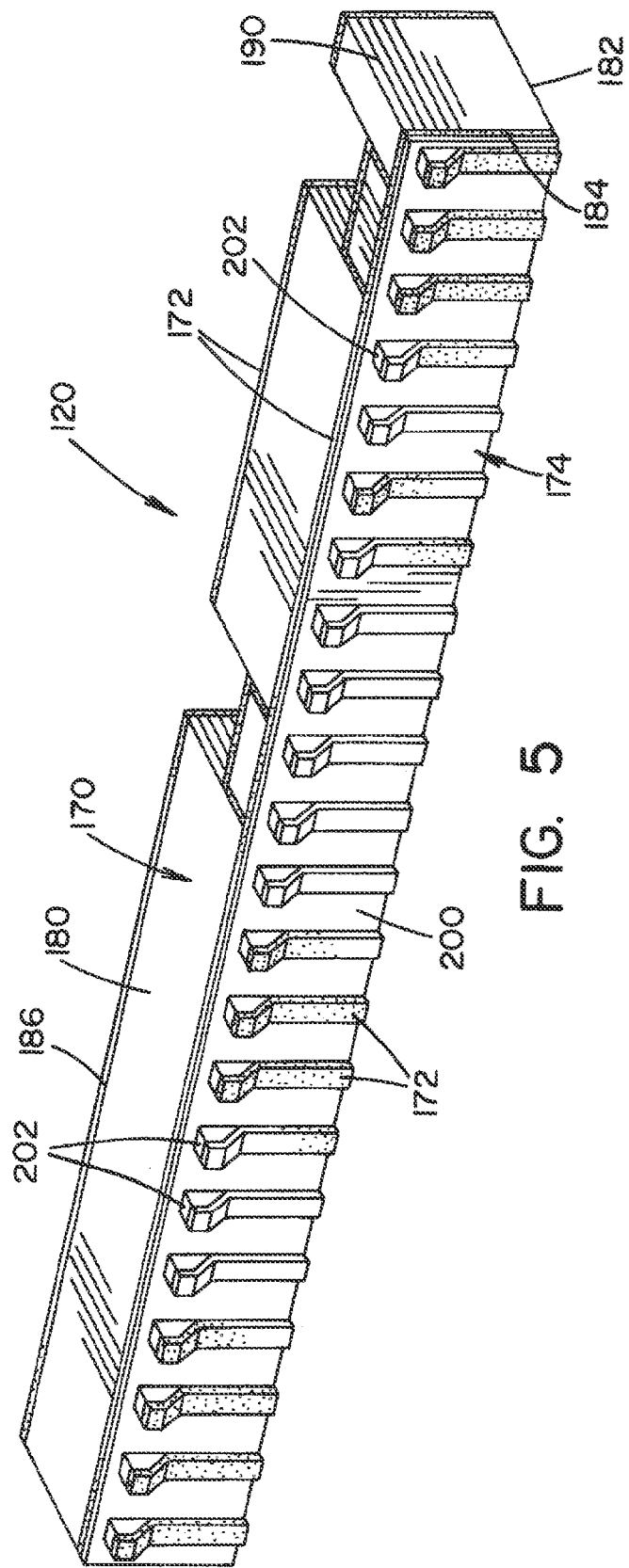
FIG. 5 is a perspective view of the structural reinforcement member of FIG. 2.
Figure 6:
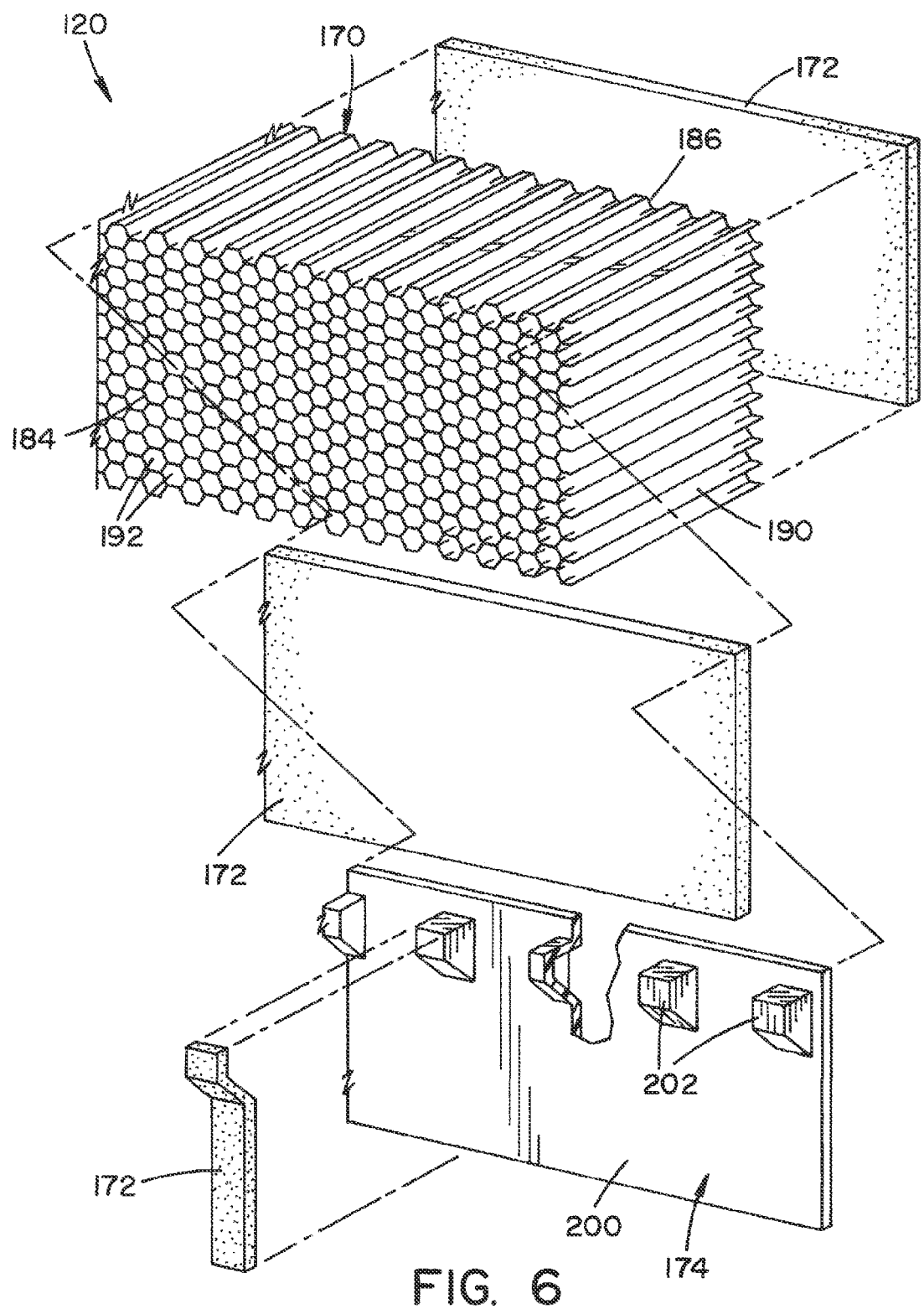
FIG. 6 is an exploded partial perspective view of the structural reinforcement member of FIG. 5.

The exemplary structural reinforcement member 120 is inserted and positioned in the cavity 126 of the hollow structural member or side sill 102. With reference to FIG. 5, the reinforcement member 120 includes a stiffener 170, an adhesive 172 secured to the stiffener 170, and a frame 174 secured to the stiffener 170. The stiffener 170 includes a top surface 180, a bottom surface 182, an outer side surface 184, and an inner side surface 186. With additional reference to FIG. 6, the stiffener 170 can include a honeycomb structure 190 defining a plurality of openings 192. The honeycomb structure 190 has a shape that substantially conforms to a cross-section of a section of the hollow structural member 102 to be reinforced by the stiffener 170. The stiffener 170 includes a second metal or metal alloy that is different from the first metal or metal alloy of the side sill 102, and according to one aspect, the stiffener 170 can be formed of an aluminum or aluminum alloy. In the depicted embodiment, the adhesive 172 is provided on both the outer side surface 184 and the inner side surface 186 of the stiffener, which positions the adhesive 172 on opposite sides of the openings 192 of the honeycomb structure 190.

The frame 174 is adhered to one of the side surfaces of the stiffener 170, and in the depicted embodiment, the frame is adhered to the outer side surface 184 via the adhesive 172. The frame 174 is configured to substantially conform to the shape of the inner surface of the hollow structural member or side sill 102 and is configured for mounting to a portion of the inner surface of the side sill 102. According to one aspect, the frame 174 includes a side 200 having at least one projection 202 extending outwardly therefrom. The projection 202 is dimensioned to be received in the channel 160 defined in the outer panel member 122 of the side sill 102. As shown, the frame 174 can include a plurality of spaced apart projections 202 arrayed along the side 200; although, this is not required. Alternatively, the frame 174 can include a single elongated projection 202 which extends substantially along a longitudinal extent of the frame side 200. Adhesive 172 can be provided along an outer surface of each projection 202, and in the depicted embodiment, strips of adhesive 172 are provided over the projections 202 and vertically on the frame side 200. The frame 174 may be formed of a variety of materials. Exemplary materials include polymeric materials (e.g., plastics, elastomers, thermoplastics, thermosets, combinations thereof or the like). The materials of the frame 174 may also be reinforced with minerals, fibrous materials (e.g., glass, carbon or nylon fibers), combinations thereof or the like. With the differing materials for the side sill 102 and the stiffener 170, contact between the inner surface of the side sill 102 and a stiffener 170 can cause galvanic corrosion. The material for the frame 174 is selected so that it insulates the stiffener 170 from the inner surface of the side sill 102 which in turn prevents galvanic corrosion.

With reference back to FIGS. 3 and 4, the reinforcement member 120 is positioned in the cavity 126 of the side sill 102 with the projections 202 being slidingly received in the channel 160 defined in the sidewall 130 of the outer panel member 122. The honeycomb structure 190 is positioned in the side sill 102 so that the openings 192 are oriented substantially normal to a longitudinal axis of the side sill. Again, the adhesive 172 is adhered to the open ends of the honeycomb structure 190 so that it will not allow anticorrosion fluid, such as e-coat, to pass therethrough. A gap 210 is provided between the adhesive 172 located on the side 200 of the frame 174 and the inner surface of the outer panel member 122, and a corresponding gap 212 is provided between the adhesive 172 secured to the inner side surface 186 of the stiffener 170 and the inner surface of the inner panel member 124. The gaps 210, 212 allow anticorrosion fluid to flow between the reinforcement member 120 and the inner surface of the side sill 102.

The adhesive 172 is selected so as to be activatable under a desired condition. Used herein, activatable means that the adhesive 172 softens (e.g., melts), cures, expands, foams or a combination thereof upon exposure to a condition. Thus, according to one embodiment, the adhesive 172 may be a heat-activated and/or epoxy-based resin having foamable characteristics. Of course, the adhesive 172 may be activated by other conditions or stimuli. The choice of the adhesive 172 used will typically be dictated by performance requirements and economics of the specific application and requirements. According to the present disclosure, the adhesive is substantially dry to the touch prior to activation and is activatable to expand toward the inner surface of the side sill 102 to fill at least a portion of the gaps 210, 212 when the vehicle body 100 is sent through a paint process and the adhesive is exposed to increased temperatures. The adhesive 172 also has increased ductility for better load distribution along the entire longitudinal axis of the stiffener 170. To secure the adhesive 172 to the stiffener 170, the adhesive can be preheated to a temperature suitable to make it tacky, yet low enough that it will not exceed its cure or expansion temperature.

Figure 7:
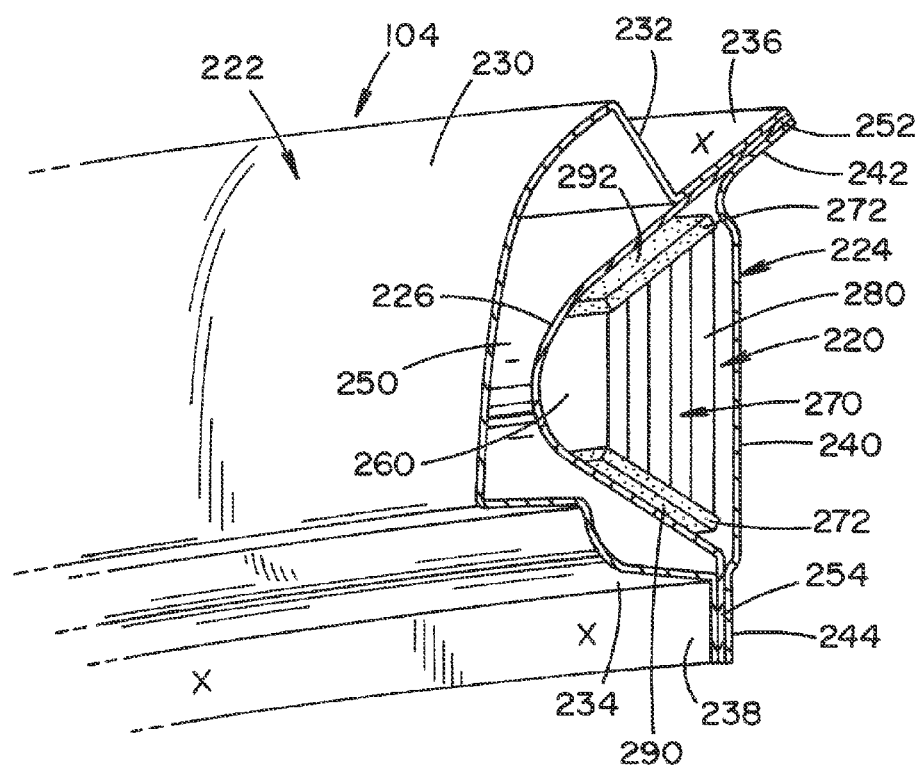
FIG. 7 is a cross-sectional perspective view of a second structural member of the vehicle body portion of FIG. 1 taken along line 7-7 of FIG. 1, the second structural member including an exemplary reinforcement member according to a second embodiment aspect of the present disclosure.
Figure 8:
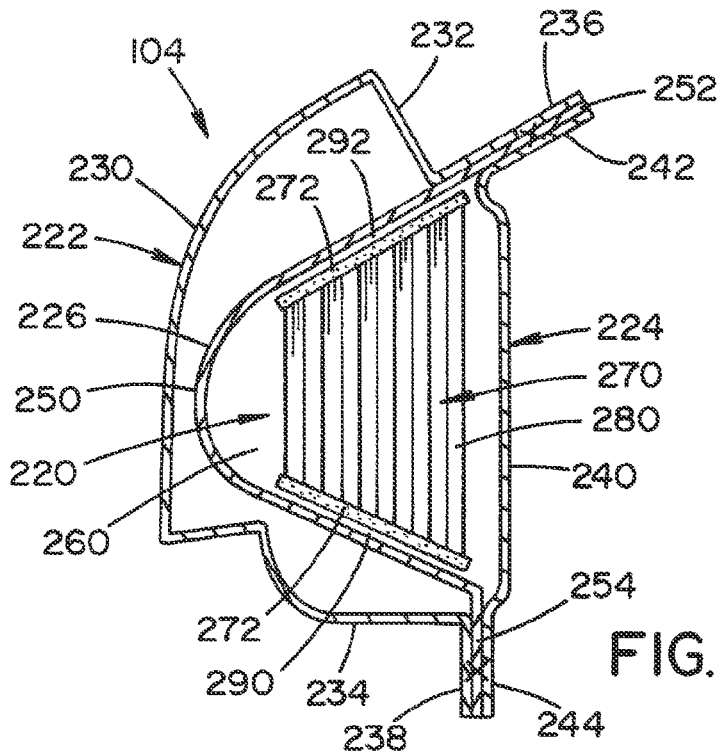
FIG. 8 depicts the structural reinforcement member of FIG. 7 prior to attachment to the second structural member.
Figure 9:
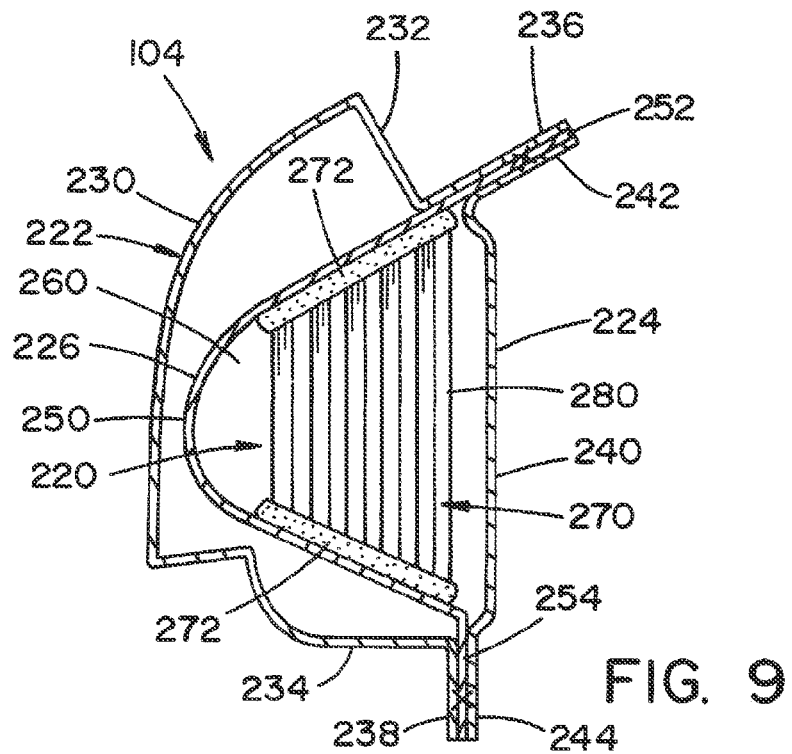
FIG. 9 depicts the structural reinforcement member of FIG. 7 fixedly attached to the second structural member.

FIGS. 7-9 illustrate a reinforcement member 220 positioned in the hollow structural member or A-pillar 104. As shown, the A-pillar 104 includes an outer panel member 222, an inner panel member 224, and a stiffener 226. The outer panel member 222 includes a sidewall 230, a top wall 232, and a bottom wall 234. A flange 236 extends from an end portion of the top wall 232 and a flange 238 extends from an end portion of the bottom wall 234. The inner panel member 224 includes a sidewall 240 having flanges 242, 244 extending from respective upper and lower end portions of the sidewall 240. The stiffener 226 is interposed between the outer panel member 222 and the inner panel member 224 and can have a shape similar to the shape of the outer panel member 222. Particularly the stiffener 226 includes a sidewall 250 having upper and lower flanges 252, 254 extending outwardly from opposite edge portions of the sidewall 250. To form the A-pillar 104, the stiffener 226 is provided between the outer panel member 222 and inner panel member 224 so that the upper flange 250 is sandwiched between the flanges 236, 242 and the lower flange 254 is sandwiched between the flanges 238, 244. The flanges are then fixedly secured to each other, for example by welding. The A-pillar 104 defines an elongated channel 260 dimensioned to receive the reinforcement member 220.

Figure 10:
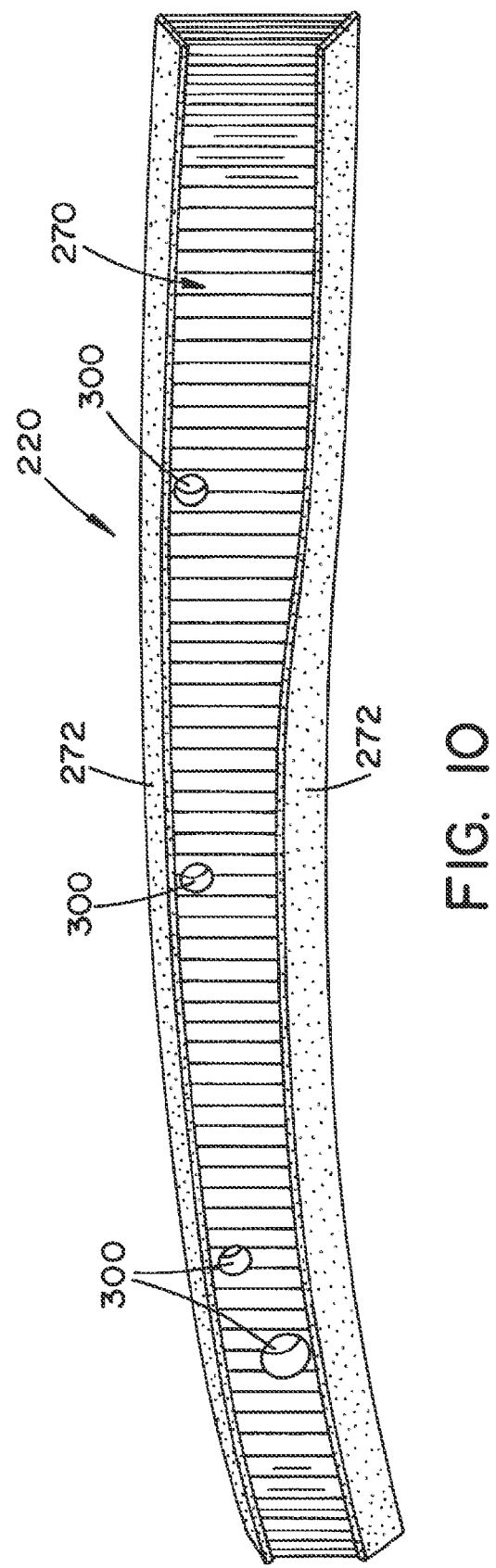
FIG. 10 is a perspective view of the structural reinforcement member of FIG. 7.
Figure 11:
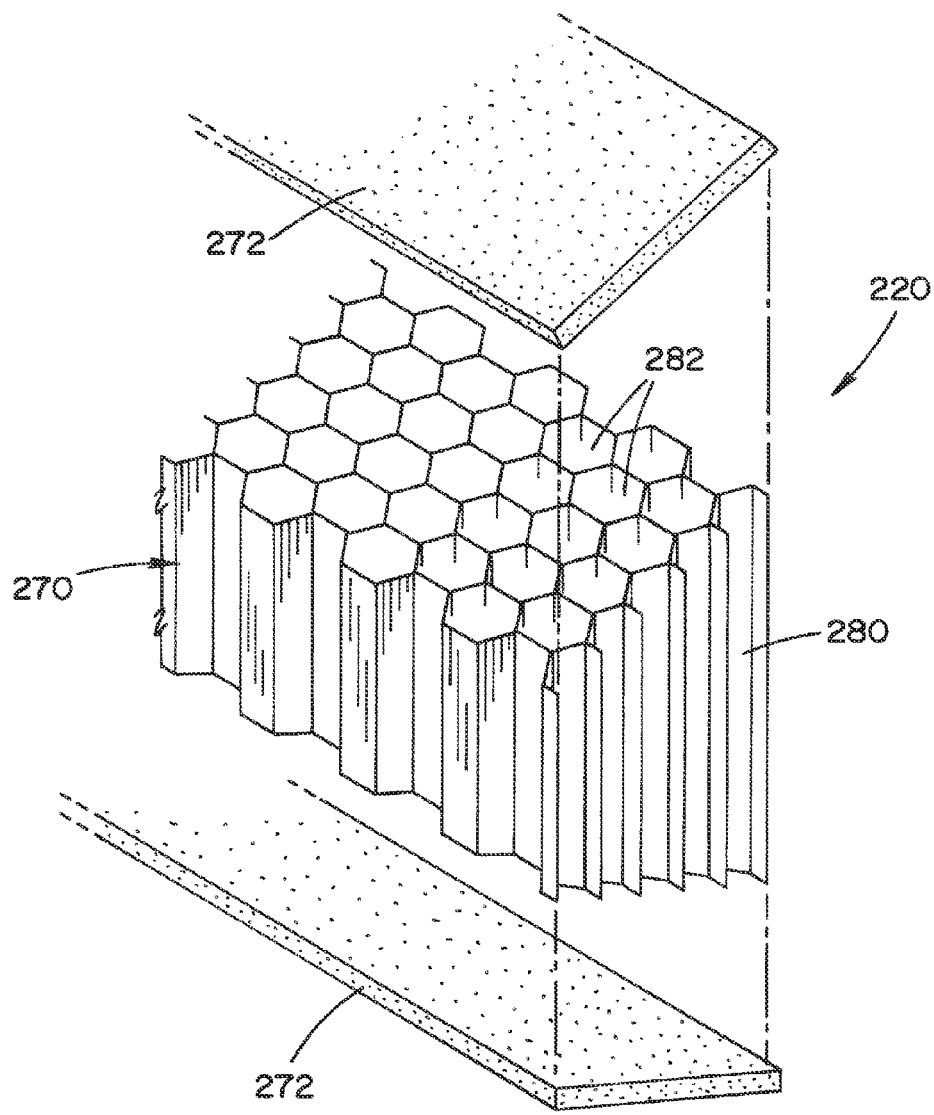
FIG. 11 is an exploded partial perspective view of the structural reinforcement member of FIG. 10.

With reference to FIGS. 10 and 11, the reinforcement member 220 includes a stiffener 270 and an adhesive 272 secured directly to the stiffener. The adhesive 272 can be similar to the adhesive 172 so that the adhesive is substantially dry to the touch prior to activation and is activatable to expand toward the inner surface of the A-pillar 104 during a paint process. Similar to the stiffener 170, the stiffener 270 includes a honeycomb structure 280 having a plurality of openings 282. The honeycomb structure 280 has a shape that substantially conforms to a cross-section of a section of the hollow structural member 104 to be reinforced by the stiffener, and the adhesive 272 is positioned to close the opposite open ends of the plurality of openings 282 of the honeycomb structure 280 to prevent the flow of anticorrosion fluid therethrough. Again, with the A-pillar 104 being formed of a first metal or metal alloy, such as steel or steel alloy, and the honeycomb structure 280 of the reinforcement member 220 being formed of a second metal or metal alloy, such as aluminum or aluminum alloy, the adhesive 272 provided on the opposite sides of the honeycomb structure 280 isolates the honeycomb structure from the inner surface of the A-pillar 104.

FIG. 8 shows the reinforcement member 220 inserted in the cavity 260 of the A-pillar 104 prior to activation of the adhesive 272. A gap 290 is provided between the adhesive 272 secured to one side of the honeycomb structure 280 and the inner surface of the stiffener 226 and a corresponding gap 292 is provided between the adhesive 272 secured to the other side of the honeycomb structure 280 and the inner surface of the stiffener 226. The stiffener 270 is positioned in the cavity 260 so that the openings 282 of the honeycomb structure 280 are oriented substantially normal to a longitudinal axis of the A-pillar 104. FIG. 9 depicts the A-pillar 104 after the paint process. The adhesive 272 expanded toward the inner surface of the stiffener 226 and fills at least a portion of the gaps 290, 292 provided between the reinforcement member 220 and the inner surface of the stiffener 226. Further, the reinforcement member 220 can be provided with bores 300 extending through the honeycomb structure 280 in a direction substantially normal to the axes of the openings 282 to allow any e-coat trapped in the openings 282 of the honeycomb structure 280 to escape the honeycomb structure prior to activation of the adhesive 272 (see FIG. 10).

Figure 12:
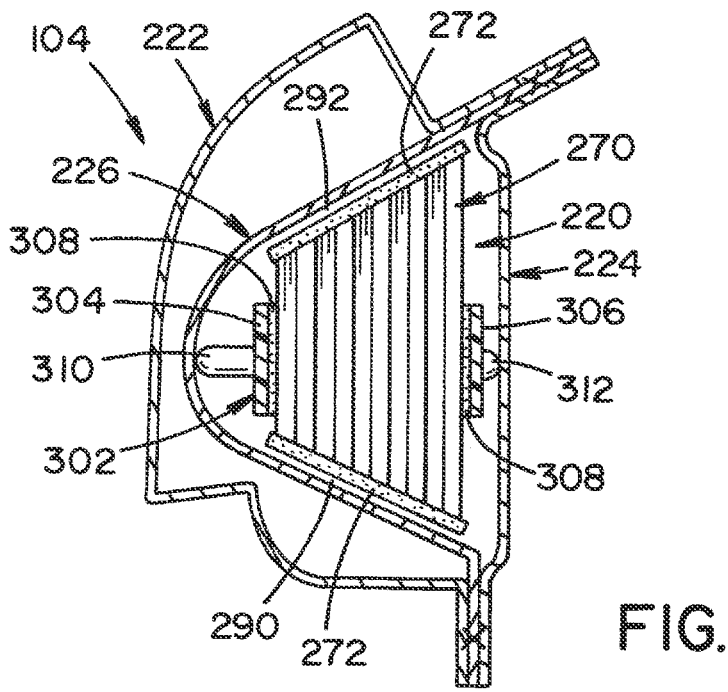
FIG. 12 is a cross-sectional view of the second structural member similar to FIG. 7, the second structural member including an exemplary reinforcement member according to a third embodiment of the present disclosure.
Figure 13:
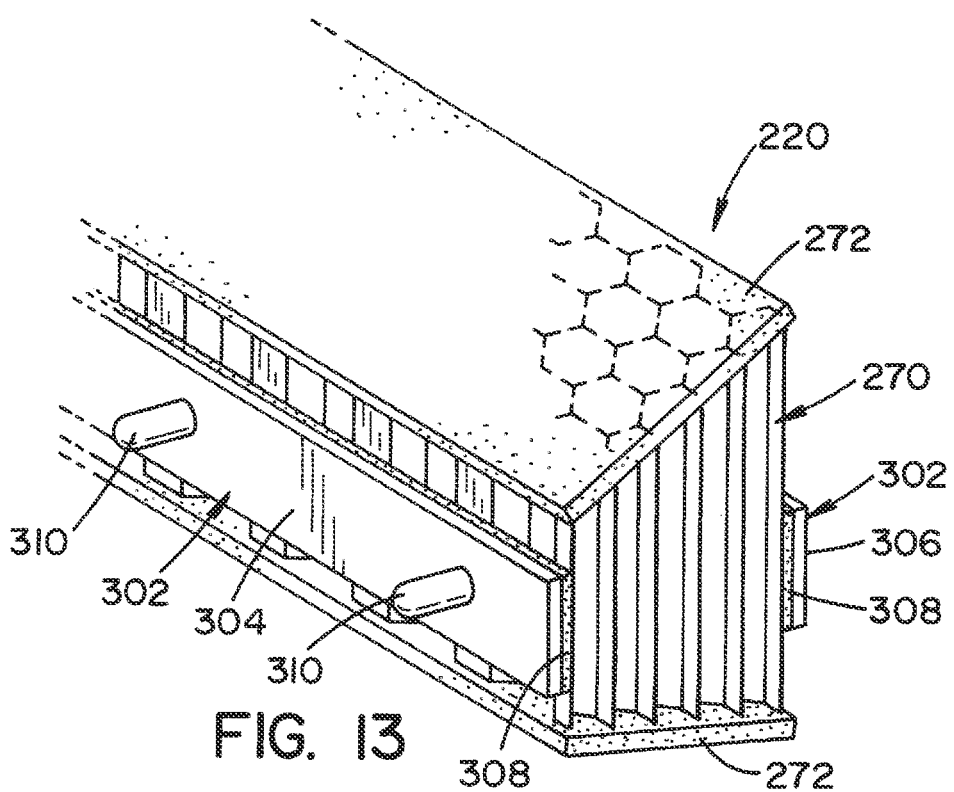
FIG. 13 is a perspective view of the structural reinforcement member of FIG. 12.

To positively locate the reinforcement member 220 in the cavity 260 defined by the A-pillar 104, a frame 302 can be secured to the stiffener 270 and positioned between the stiffener 270 and the inner surface of the stiffener 226 of the A-pillar 104 to maintain the gaps 290, 292 prior to expansion of the adhesive 272. As depicted in FIGS. 12 and 13, the frame 302 can include a first frame part 304 and a second frame part 306. The frame 302 is positioned on the stiffener 270 so that the frame 302 is substantially normal to the adhesive 272 which is secured to the opposite sides of the honeycomb structure 280. Particularly, the first frame part 304 is provided between the stiffener 226 of the A-pillar 104 and the stiffener 270 and the second frame part 306 is provided between the inner panel member 224 of the A-pillar 104 and the stiffener 270. An adhesive 308 can be used to secure the first and second frame parts 306 to the stiffener 270. The adhesive 308 can be similar to the adhesive 272 such that the adhesive is heat-activated; although, this is not required.

The first frame part 304 includes at least one spacer member 310 extending outwardly therefrom for engaging the inner surface of the stiffener 226 of the A-pillar 104. As shown, the spacer member 310 can be defined by a plurality of spaced apart projections; although, this is not required. Similarly, the second frame part 306 includes at least one spacer member 312 extending outwardly therefrom for engaging the inner surface of the inner panel member 224 of the A-pillar 104. Similar to spacer member 310, the spacer member 312 can be defined by a plurality of spaced apart projections. It should be appreciated alternative configurations for the spacer members 310, 312 are contemplated. For example, each of the spacer members 310, 312 can be defined by a single elongated projection which extends along a longitudinal extent of the respective first and second frame parts 304, 306.

Figure 14:
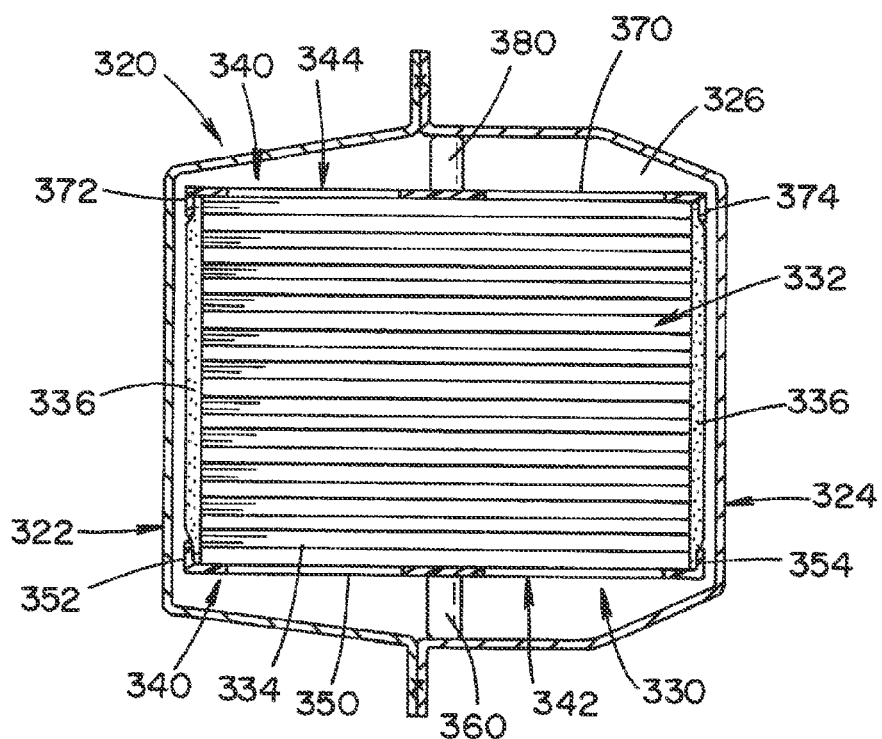
FIG. 14 is a cross-sectional view of another aspect of the first structural member of the vehicle body portion of FIG. 1, the structural member including an exemplary reinforcement member according to a fourth embodiment of the present disclosure.
Figure 15:
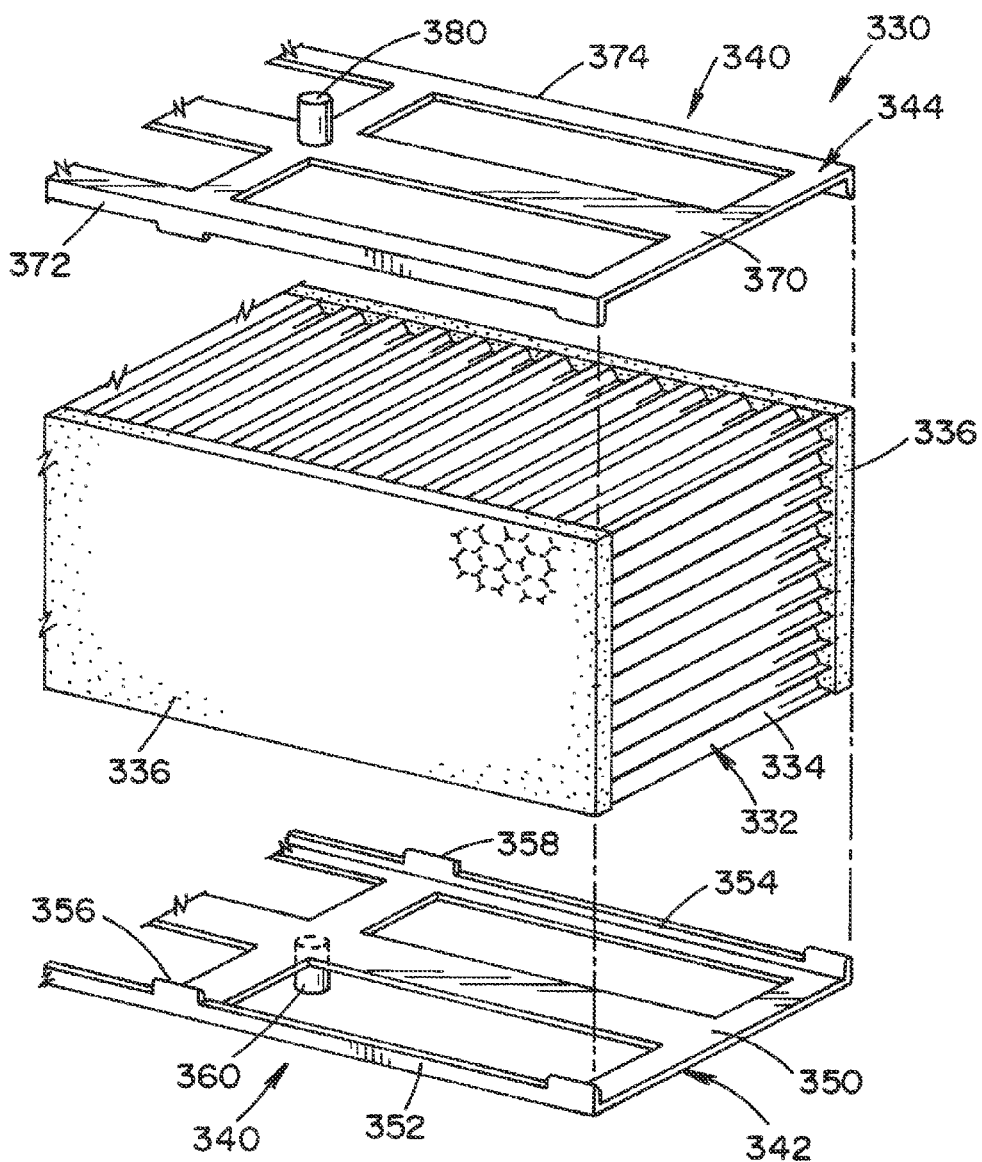
FIG. 15 is an exploded partial perspective view of the structural reinforcement member of FIG. 14.

FIGS. 14 and 15 depict an alternative configuration of a side sill 320 of the frame 108 of the vehicle body 100. According to this aspect, the side sill 320 includes an outer panel member 322 secured to an inner panel member 324 and defines a cavity 326. However, unlike the side sill 102, a channel is not provided in one of the panel members 322, 324 for positively locating an exemplary reinforcement member 330 in the cavity 326. Similar to the previously described reinforcement members, the reinforcement member 330 includes a stiffener 332 including a honeycomb structure 334 having a plurality of openings (not shown). Adhesive 336 is secured directly the stiffener 332 and positioned to close opposite ends of the plurality of openings of the honeycomb structure 334. The adhesive 336 can have properties similar to the adhesive 172 and 272.

A frame 340 is secured to the stiffener 332 and positioned substantially normal to the adhesive 336. The frame 340 is located between the stiffener 332 and the inner surface of the side sill 320 to maintain a gap between the reinforcement member 330 and the inner surface prior to expansion of the adhesive 336. The frame 340 includes a first frame part 342 and a second frame part 344. The first frame part 342 includes a base 350 and sidewalls 352, 354 extending from the base 350. Provided on each of the sidewalls 352, 354 are engagement members 356, 358. A spacing between the sidewalls 352, 354 is such that the stiffener 332 together with the adhesive 336 can be located on the base 350 with the engagement members 356, 358 engaging the stiffener 332. A spacer member 360 extends from the base 350 and is dimensioned to engage the inner surface of the side sill 320. Similarly, the second frame part 344 includes a base 370, opposed sidewalls 372, 374 configured to engage the stiffener 332 and a spacer member 380 dimensioned to engage the inner surface of the side sill 320. Similar to the previous embodiments of the reinforcement member, the frame 340 is configured to substantially conform to the shape of the inner surface of the side sill 320 and maintains a gap between the reinforcement member 330 and the inner surface of the side sill 320 prior to expansion of the adhesive 336 which again allows e-coat to freely flow along the inner surface of the side sill.

Figure 16:
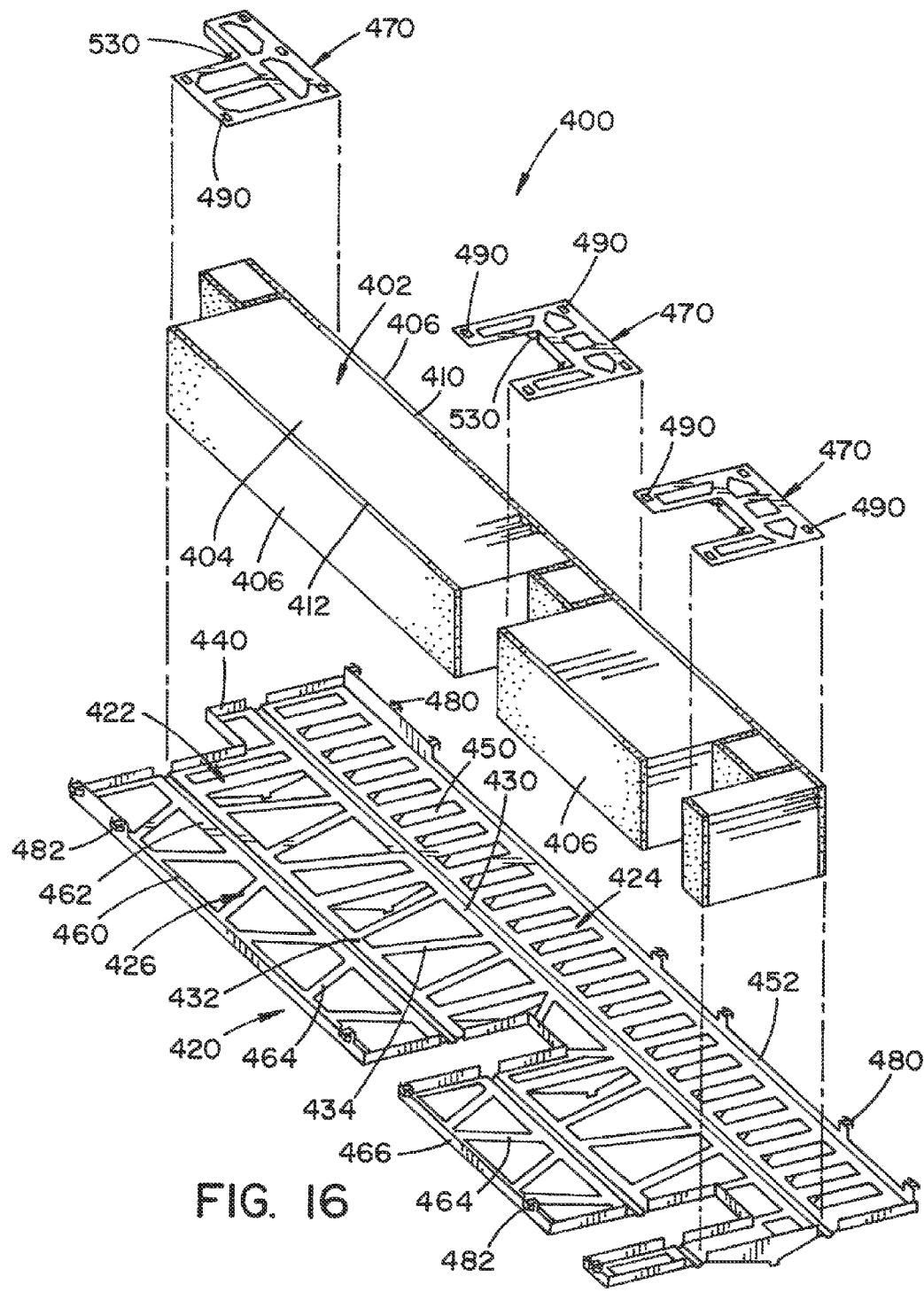
FIG. 16 is an exploded perspective view of an exemplary reinforcement member according to a fifth embodiment of the present disclosure.
Figure 17:
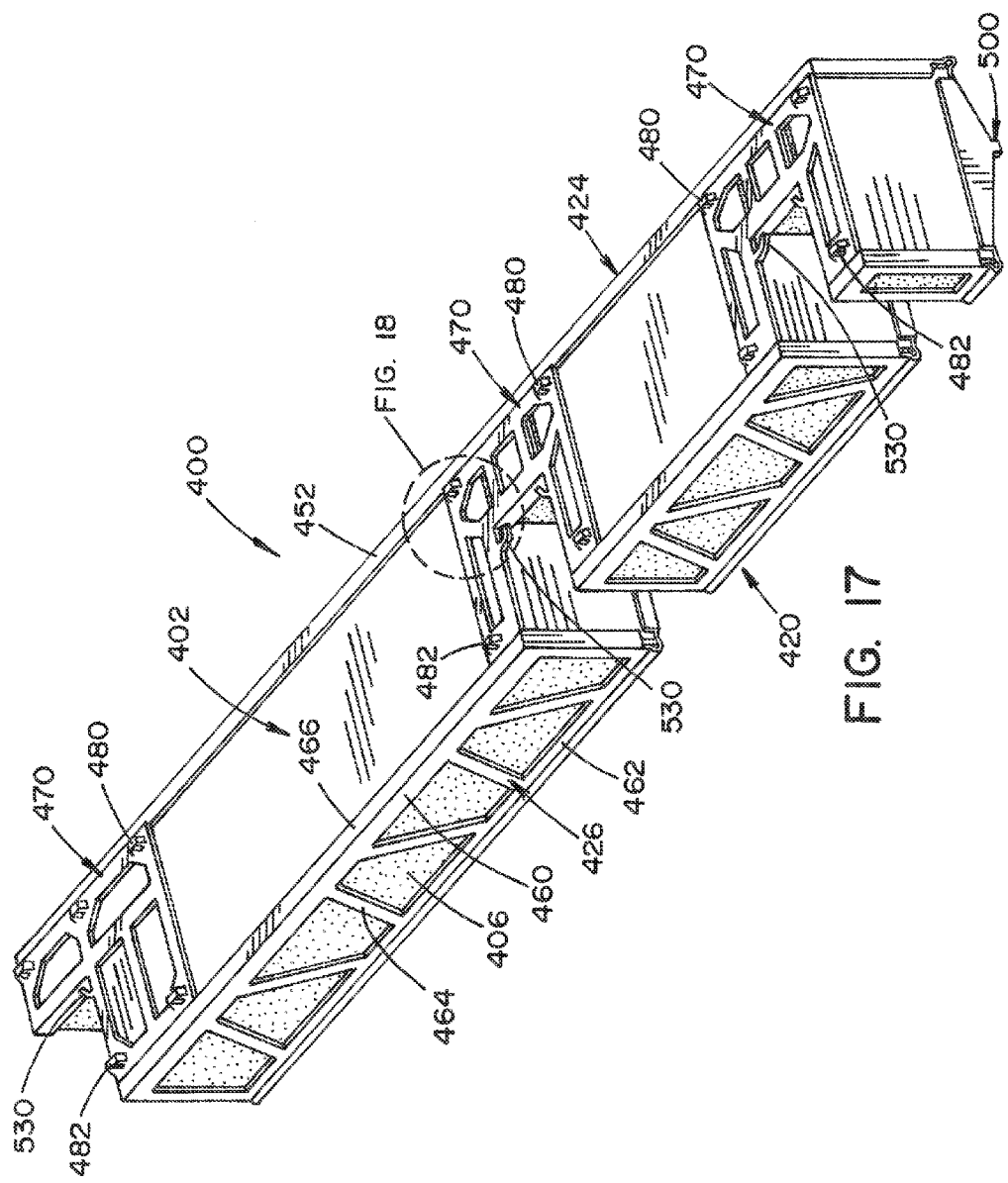
FIG. 17 is a perspective view of the structural reinforcement member of FIG.

FIGS. 16 and 17 depict another embodiment of a reinforcement member 400 for insertion in the hollow structural member or side sill 102. Similar to reinforcement member 120, the reinforcement member 400 includes a stiffener 402 including a honeycomb structure 404 having a plurality of openings which are oriented substantially normal to a longitudinal axis of the side sill 102. Adhesive 406 is secured to outer and inner side surfaces 410, 412 of the stiffener 402 and is similar to the adhesive 172. A frame 420, which is configured to substantially conform to the shape of the inner surface of the side sill 102, is secured to the stiffener 402 and includes a base wall 422 and opposed sidewalls 424, 426 connected to the base wall. According to one aspect, each of the sidewalls 424, 426 can be hingedly connected to the base wall 420 which allows for ease of assembly of the frame 420.

The base wall 422 can include spaced longitudinal members 430, 432 and a plurality of spaced transverse members 434 spanning between the longitudinal members 430, 432. The base wall 422 further includes outwardly extending flanges 440 provided about selected portions of its periphery for engaging the stiffener 402. The sidewall 424 can include a plurality of spaced apart cutouts 450 arrayed along its length and is further provided with flanges 452 provided about selected portions of its periphery for engaging the stiffener 402. The sidewall 426 can be defined by spaced longitudinal members 460, 462 and a plurality of transverse members 464 spanning between the longitudinal members. Similar to sidewall 424, sidewall 426 includes outwardly extending flanges provided along at least a portion of its periphery provided for engaging the stiffener 402.

Figure 18:
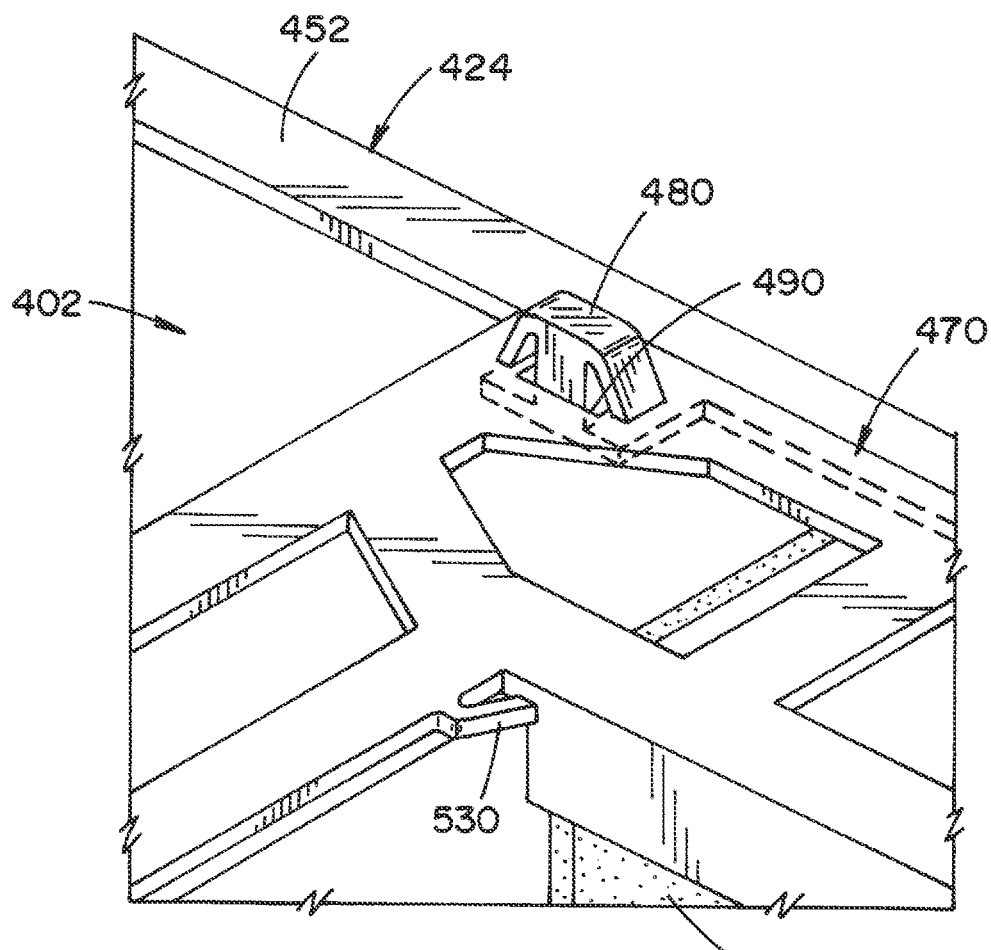
FIGS. 18-21 are enlarged perspective views of a first attachment portion of the structural reinforcement member of FIG. 17.

To assemble the reinforcement member 400, the stiffener 402 together with the adhesive 406 secured thereto is positioned on the base wall 422 of the frame 420. The sidewalls, 424, 426, which again can be hingedly connected to the base wall 422, are pivoted relative to the base wall 422 into a position that is substantially normal to the base wall. In this position, the sidewalls 424, 426 abut the adhesive 406 and the flanges 452, 466 engage the stiffener 402. As shown in FIGS. 16-18, the exemplary frame 420 can further include brackets 470 which are mounted to the sidewalls 422, 424. Particularly, provided on the sidewall 424 are a plurality of first locking members 480 and provided on the sidewall 426 are a plurality of second locking members 482. The first and second locking members 480, 482 assist in attaching the brackets 470 to the sidewalls 424, 426. In the embodiment shown, the first and second locking members are interference-type fasteners (e.g., arrowhead fasteners) that are attached to the respective flanges 452, 466 provided on the sidewalls 424, 426. The first and second locking members 480, 482 project through corresponding openings 490 in the brackets 470. With the brackets 470 secured to the sidewalls 424, 426, the frame 420 substantially surrounds the stiffener 402 and adhesive 406 secured thereto.

Figure 19:
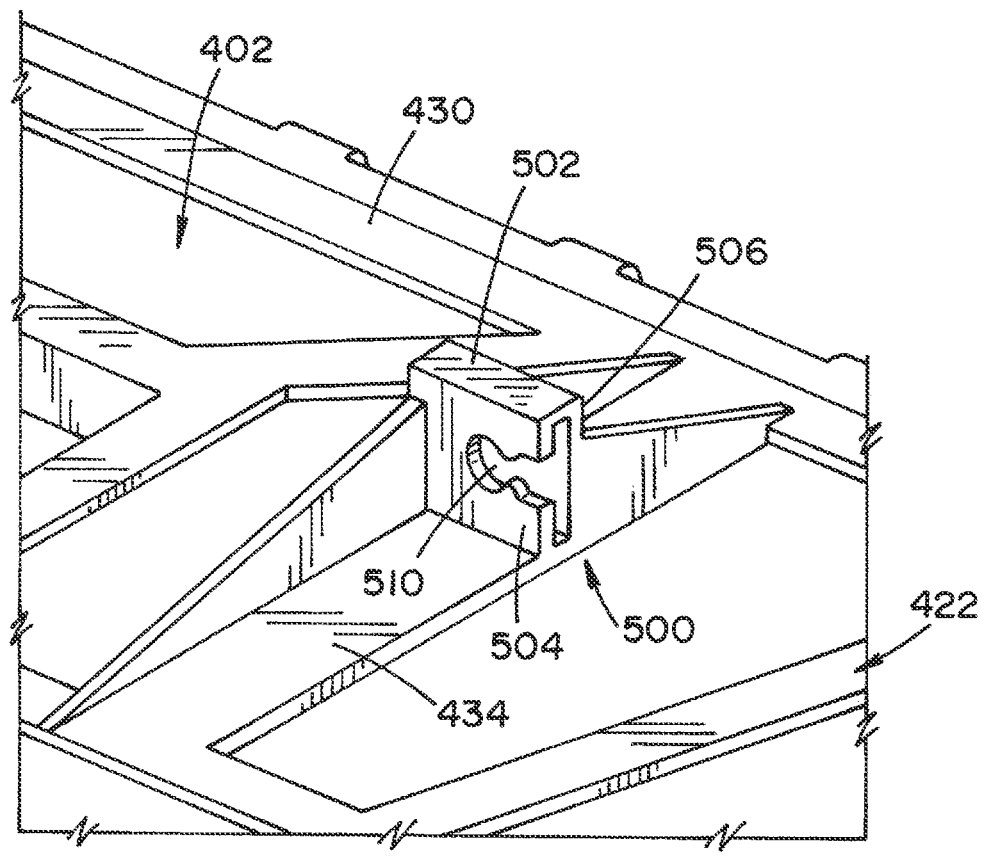
Figure 20:
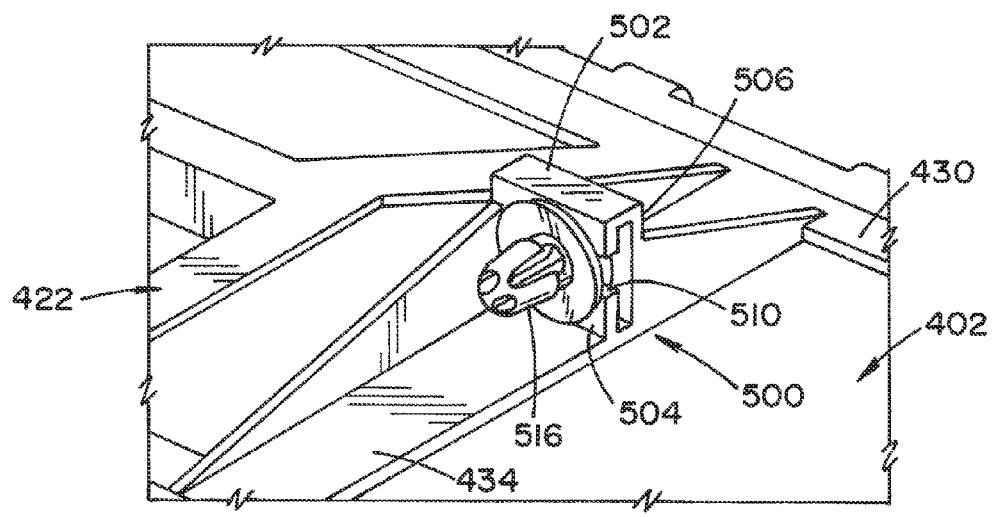
Figure 21:
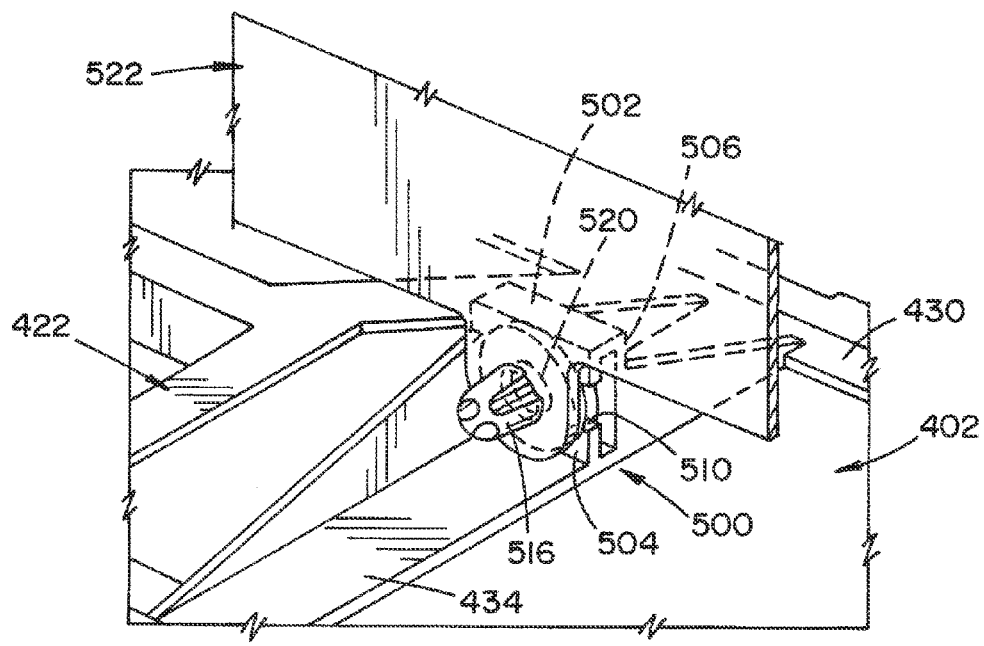
Figure 22:
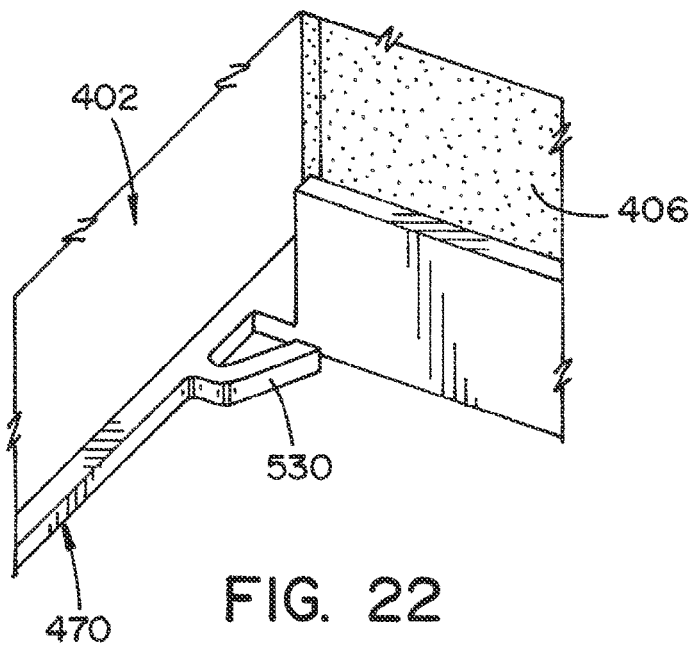
FIGS. 22 and 23 are enlarged perspective views of a second attachment portion of the structural reinforcement member of FIG. 17.
Figure 23:
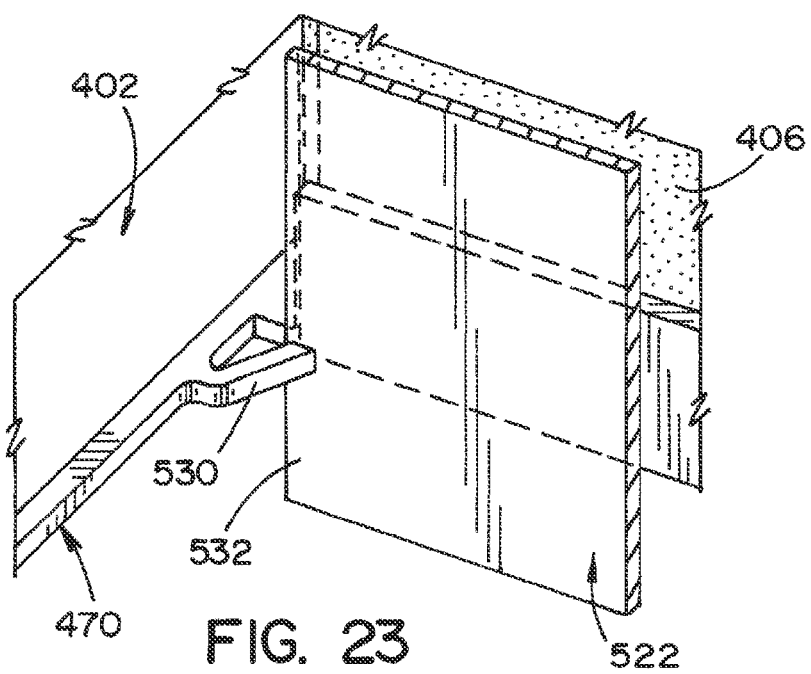
Figure 24:
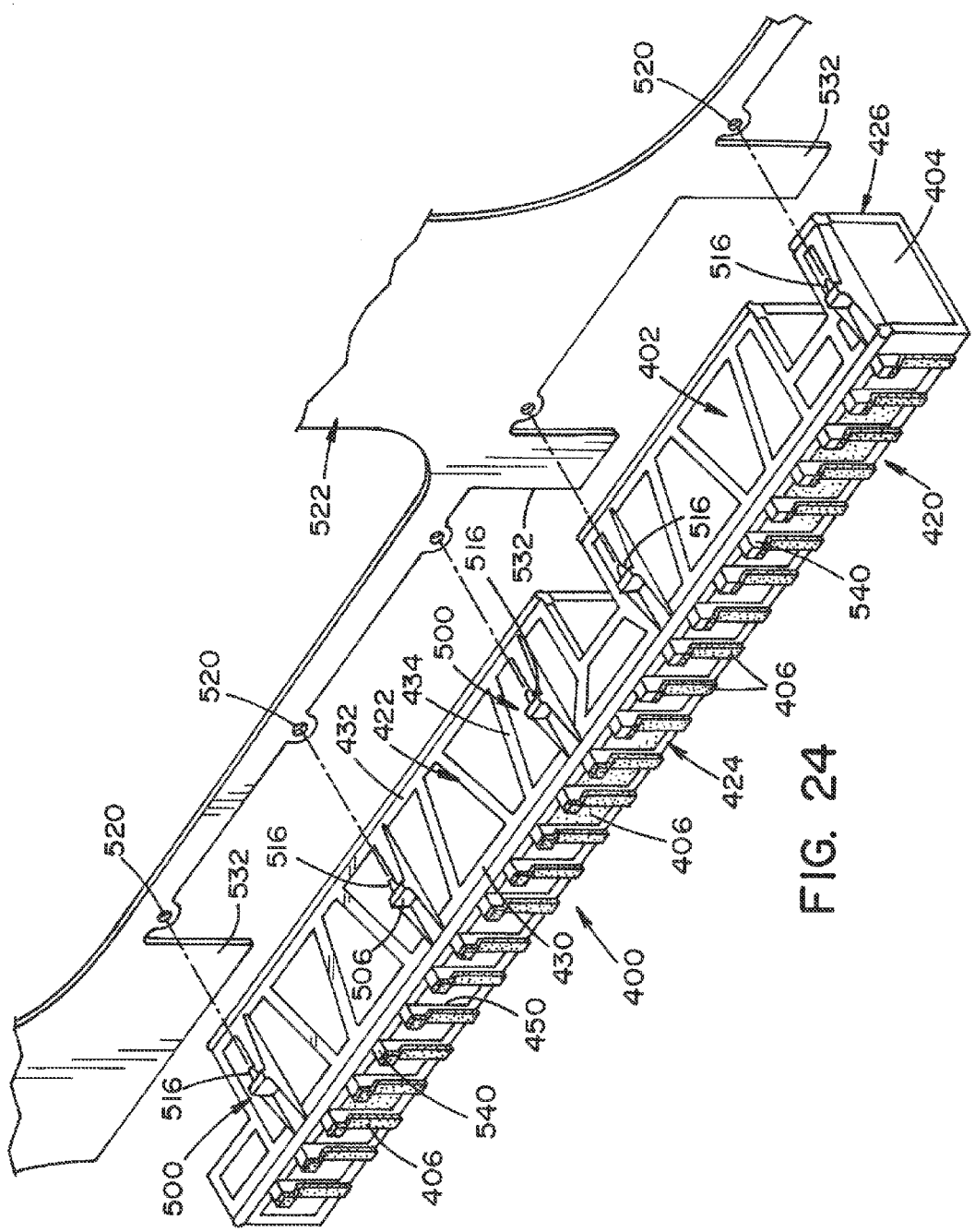
FIGS. 24 and 25 are perspective views of the structural reinforcement member of FIG. 17 being attached to yet another aspect of the first structural member of the vehicle body portion of FIG. 1.
Figure 25:
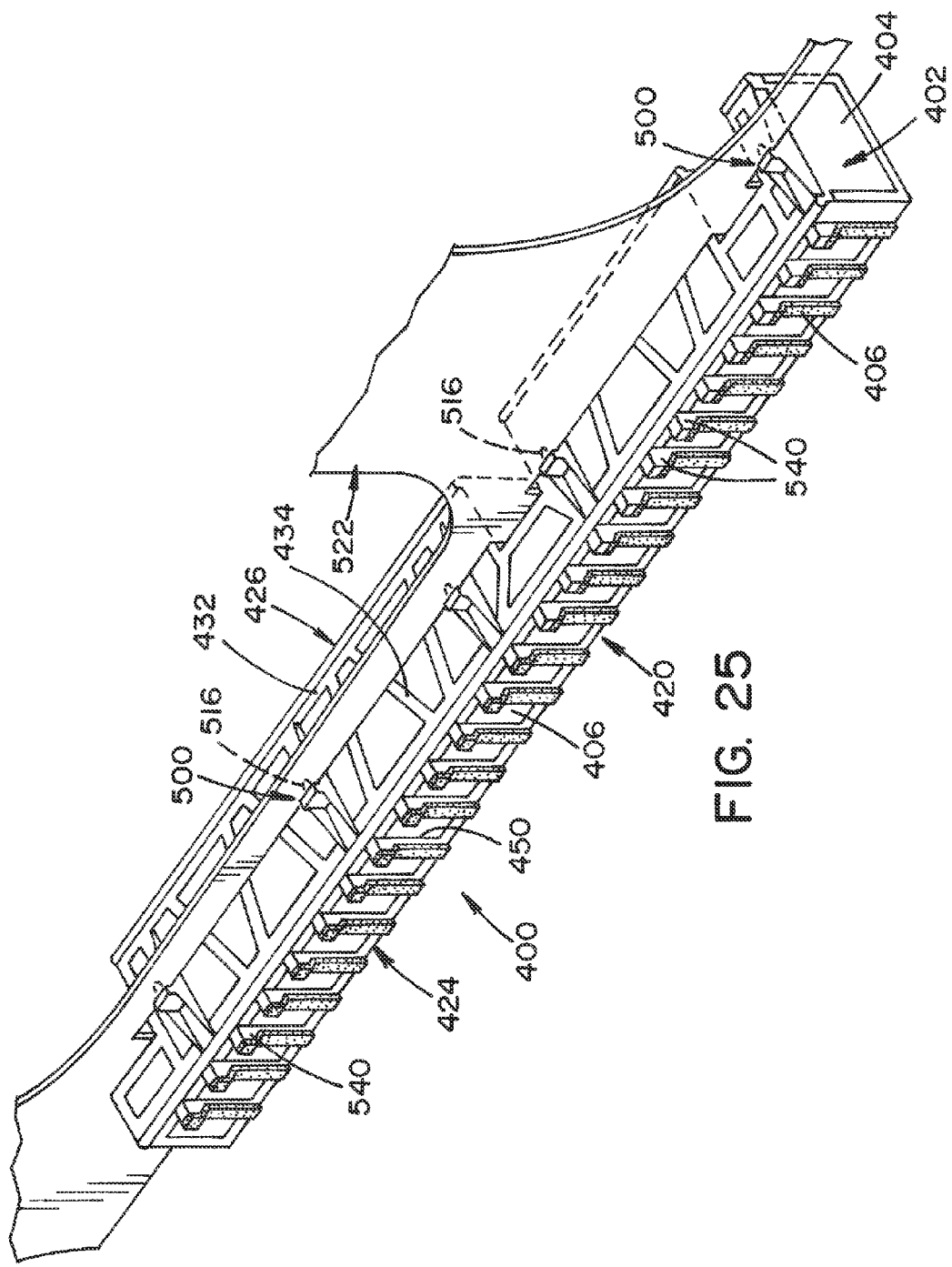

With reference now to FIGS. 19-21, as indicated previously, the base wall 422 of the frame 406 includes transverse members 434. Selected transverse members 434 are provided with clip housings 500. Each of the clip housings 500 includes a top wall 502 and opposed sidewalls 504, 506. Sidewall 504 includes a slotted opening 510 configured to retain therein a fastener or clip 516. The fastener 516 is secured in an opening 520 provided in a stiffener 522 associated with the side sill 102. To further secure the frame 420 in the cavity 126 of the side sill 102, each of the brackets 470 can include a mounting clip 530 for engaging an edge portion 532 of the stiffener 522 associated with the side sill 102 (see FIGS. 22 and 23). FIGS. 24 and 25 show the attachment of the reinforcement member 400 to the stiffener 522 associated with the side sill 102. As depicted, the fasteners 516 provided in the clip housings 500 are inserted through the openings 520 provided on the stiffener 522. The edge portions 532 of the stiffener 522 are inserted in cutouts provided in the stiffener 402 and are engaged by the mounting clips 530 provided on the brackets 470.

Similar to reinforcement member 120, the frame 406 can include at least one projection 540 extending outwardly from the sidewall 424. The projection 540 is dimensioned to be received in the channel 160 defined in the outer panel member 122 of the side sill 102. As shown, the frame 406 can include a plurality of spaced apart projections 540 arrayed along the frame; although, this is not required. Alternatively, the frame 406 can include a single elongated projection which extends substantially along a longitudinal extent of the frame. The adhesive 406 is provided on an outer surface of the projections 540.

Figure 26:
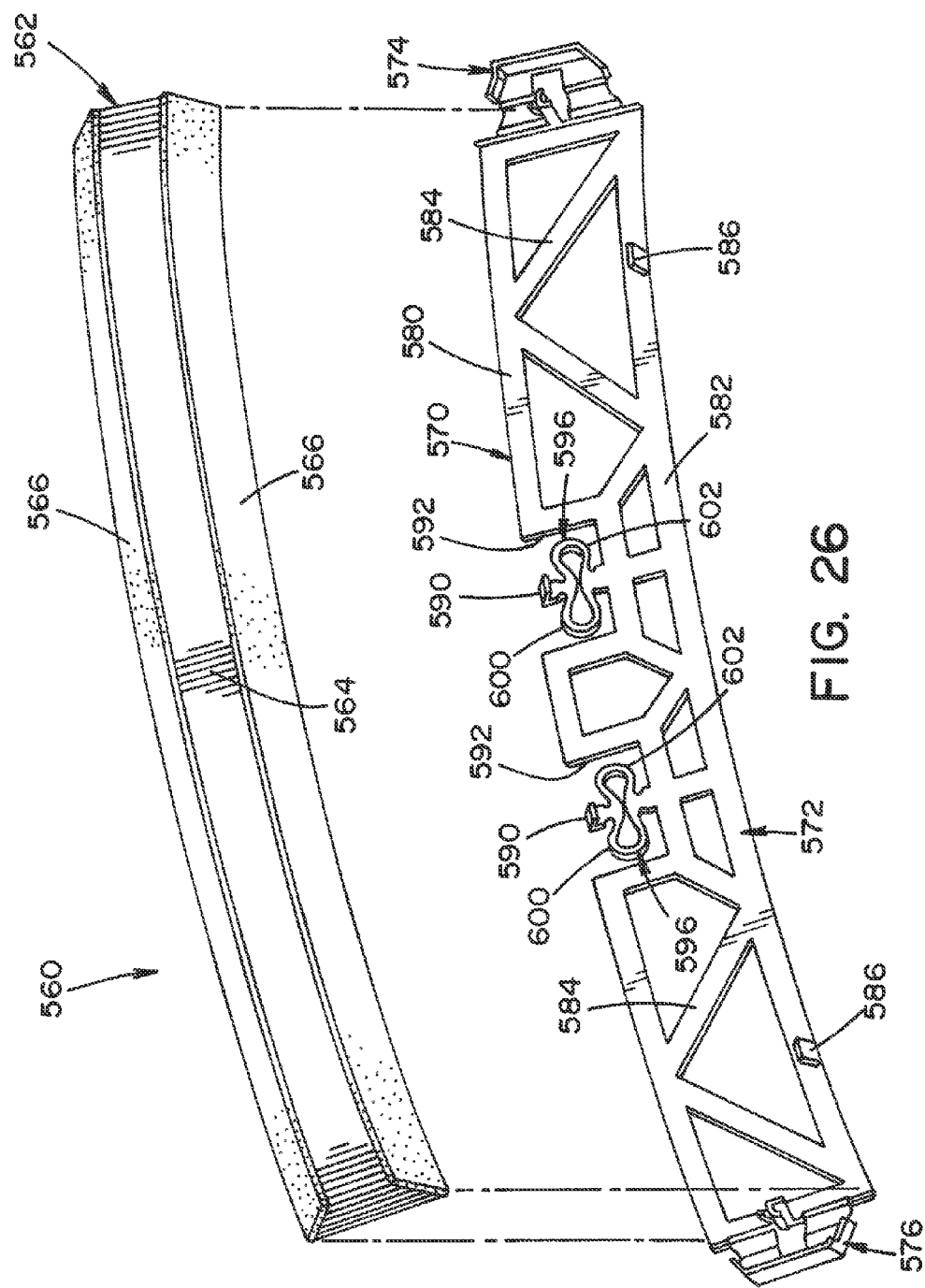
FIG. 26 is an exploded perspective view of an exemplary reinforcement member according to a sixth embodiment of the present disclosure.
Figure 27:
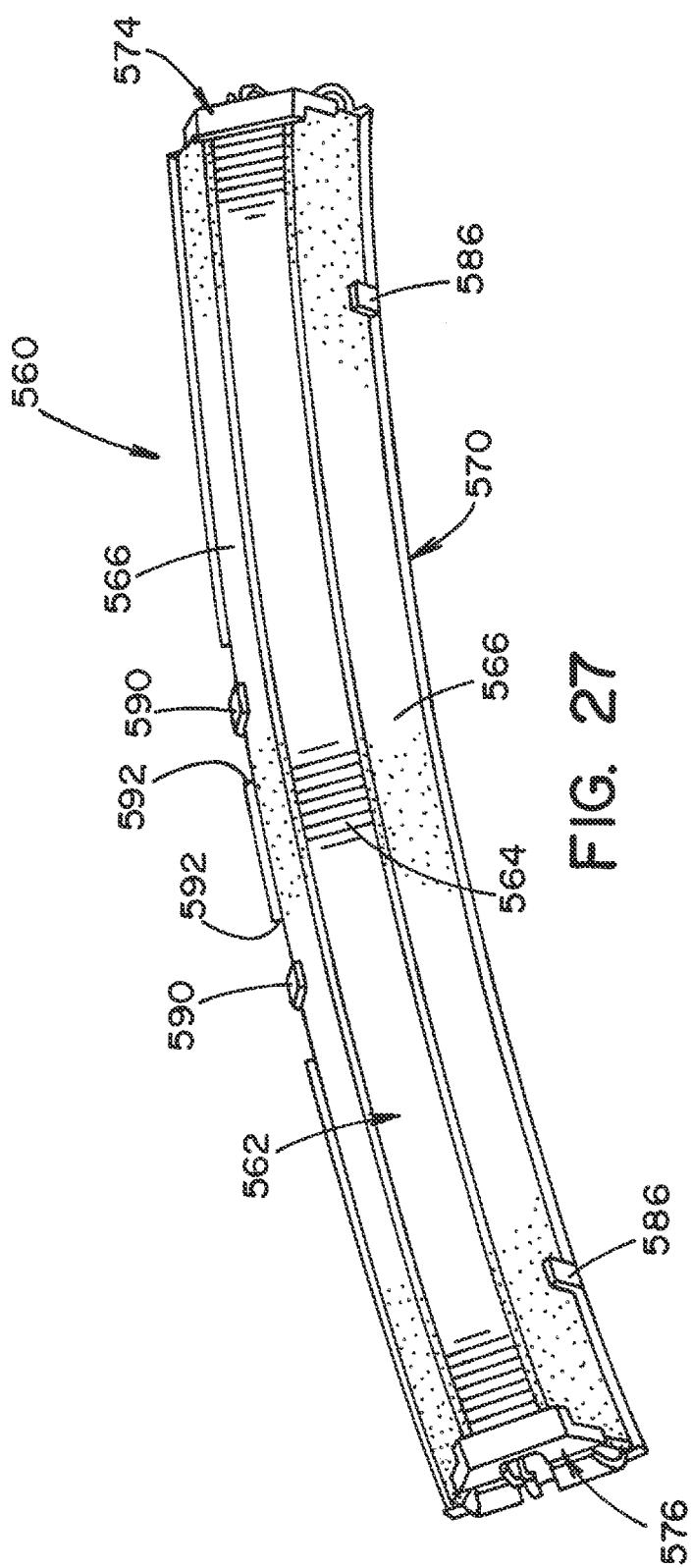
FIGS. 27 and 28 are perspective views of the structural reinforcement member of FIG. 26.
Figure 28:
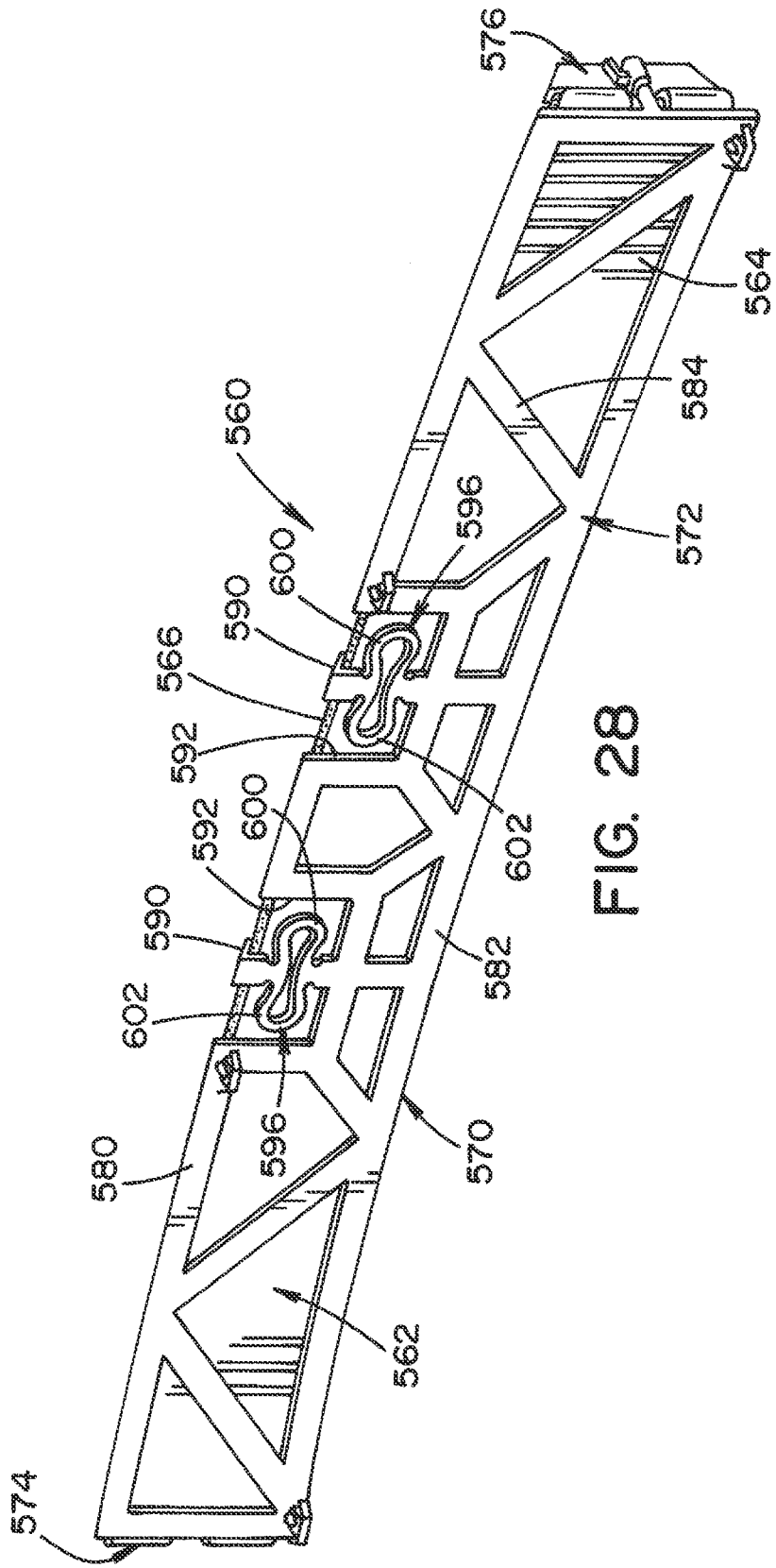

With reference now to FIGS. 26 and 27, an alternative embodiment of a reinforcement member 560 for structural member or A-pillar 104 is depicted. Similar to reinforcement member 220, reinforcement member 560 includes a stiffener 562 including a honeycomb structure having a plurality of openings which are oriented substantially normal to a longitudinal axis of the A-pillar 104. Adhesive 566 is secured to the stiffener 562. The adhesive 566 is similar to the adhesive 272. A frame 570 is secured to the stiffener 562. The frame 570 includes a base wall 572 and opposed sidewalls 574, 576 which are connected to the base wall 572. According to one aspect, the sidewalls 574, 576 can be hingedly connected to the base wall 572; although, this is not required. The base wall 572 is defined by a pair of spaced longitudinal members 580, 582 and a plurality of transverse members 584 extending between the longitudinal members 580, 582. Tabs 586 extend outwardly from the longitudinal member 582.

Figure 29:
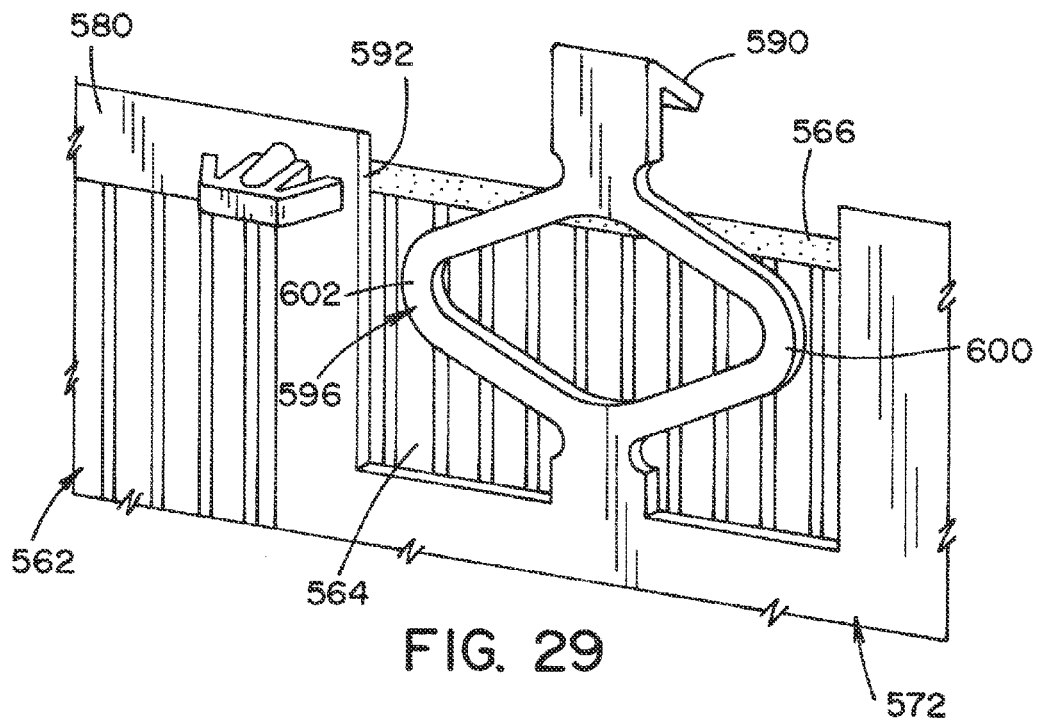
FIGS. 29 and 30 are enlarged perspective views of a first attachment portion of the structural reinforcement member of FIG. 26.
Figure 30:
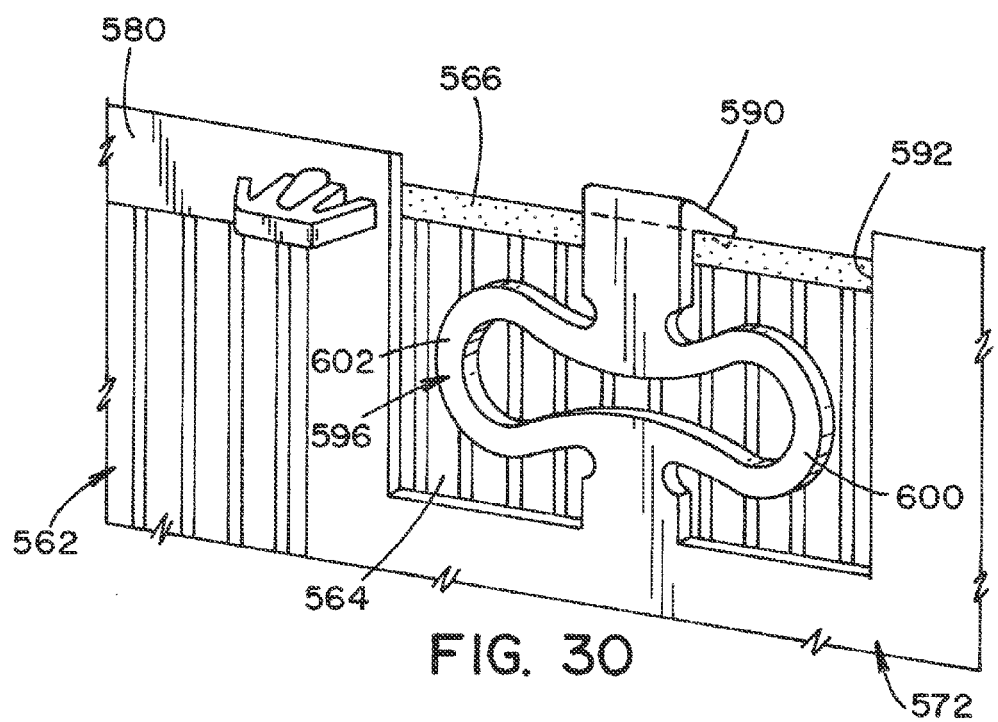

At least one base clip 590 can be provided on the base wall 572 for securing the stiffener 562 to the frame 570. As depicted, a pair of base clips 590 is provided on the base wall 572, each base clip 590 being located in a cutout 592 located on the base wall 572. Each base clip 590 is connected to the base wall 572 by a movable member 596. The movable member 596 is configured to allow the base clip 590 to move away from the frame 570 to allow for placement of the stiffener 562 on the frame and move the base clip 590 toward the frame 570 and into engagement with the stiffener 562 (FIGS. 29 and 30). As depicted, each movable member 596 can be in the shape of a bow tie and can be defined by a pair of opposed loop members 600, 602 which allow the clip 590 to move away from the base wall 572. The loop members 600, 602 are at least partially resilient so that the loop members when extended will move back toward the base wall 572. To position the stiffener 562 on the base wall 572, an edge of the stiffener 562 is positioned against the tabs 586. The base clips 590 are moved away from the frame 570 and the stiffener is then pivoted downwardly on top of the base wall 572. The base clips 590 are released and the extended loop members 600, 602 move back to their initial position thereby causing the base clips 590 to engage the stiffener 562.

Figure 31:
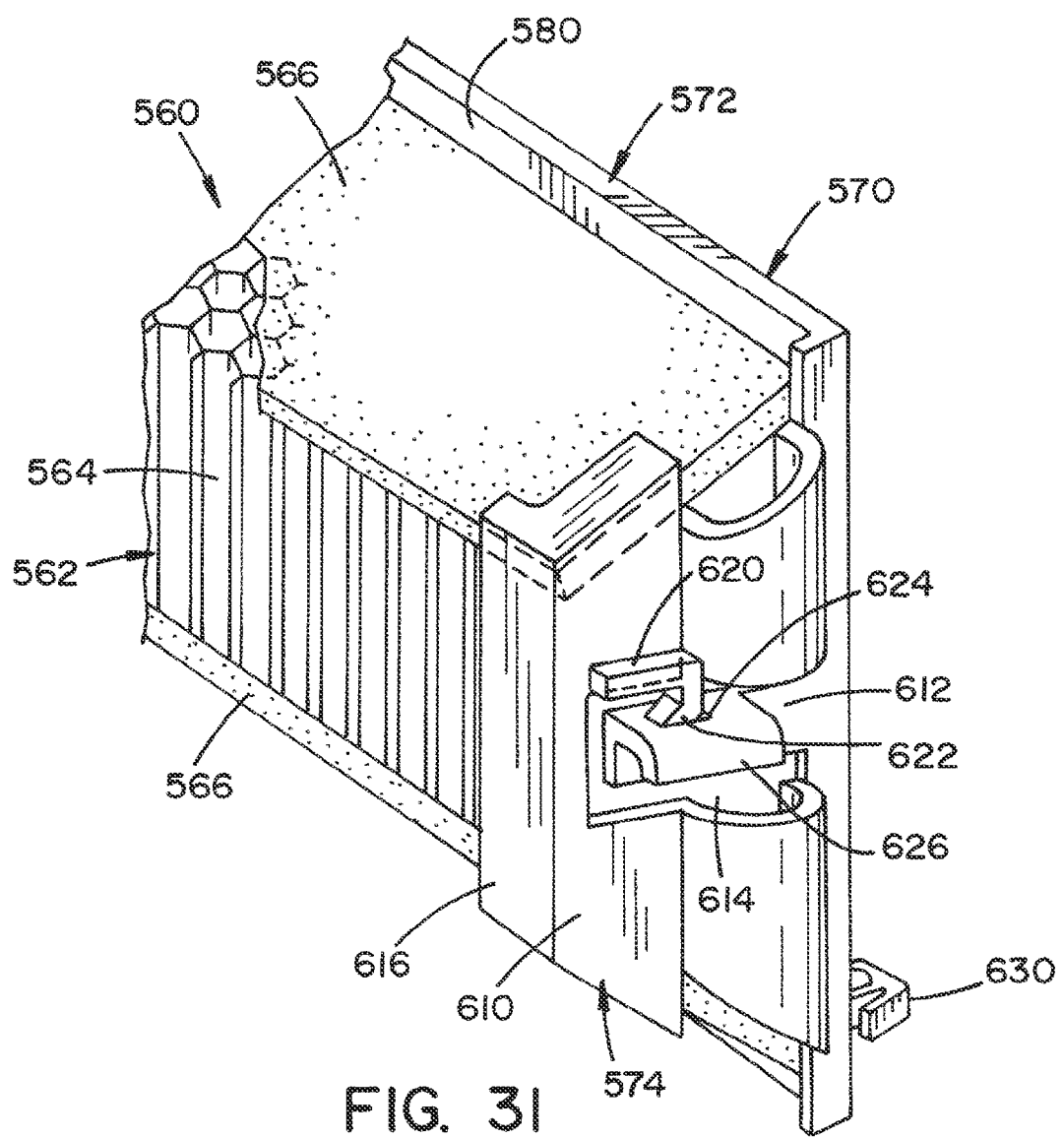
FIG. 31 is an enlarged perspective view of a second attachment portion of the structural reinforcement member of FIG. 26.

Each of the sidewalls 574, 576 of the frame 570 are configured to engage the stiffener 562 in a position which is transverse to the position of the adhesive 566 provided on the stiffener 562. As indicated previously, the sidewalls 574, 576 can be hingedly connected to the base 572 and at least one of the sidewalls includes a locking device for maintaining that sidewall in a substantially normal position relative to the base wall 572. Particularly, and with reference to sidewall 574 shown in FIG. 31, the sidewall 574 includes a movable part 610 and a stationary part 612. The movable part 610 includes a cutout 614 sized to receive the stationary part 612 and has a flange 616 extending therefrom for engaging the stiffener 560. A locking device 620 is provided on the movable part 610 adjacent to the cutout 614. According to one aspect, the locking device 620 is provided with a clip 622 that extends into the cutout 614 and it is at least partially received in a corresponding opening 624 provided on the stationary part 612. The stationary part 612 can include a ramp 626 which allows the clip 622 of the locking device 620 to slide easily into the opening 624 as the movable part 610 is moved upward relative to the base wall 672 and into engagement with the stiffener 560.

Figure 32:
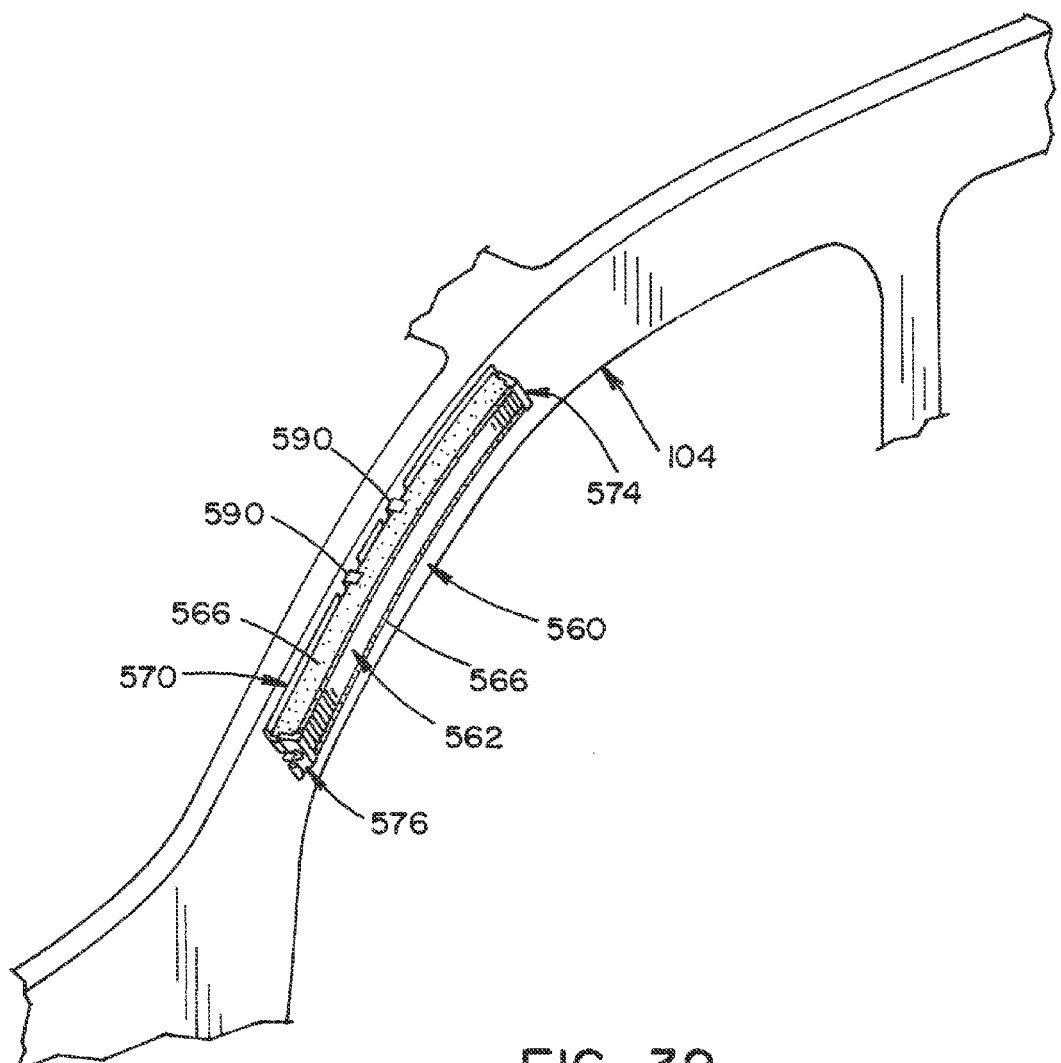
FIG. 32 is a perspective view of the reinforcement member of FIG. 26 attached to another aspect of the second structural member of the vehicle body portion of FIG. 1.
Figure 33:
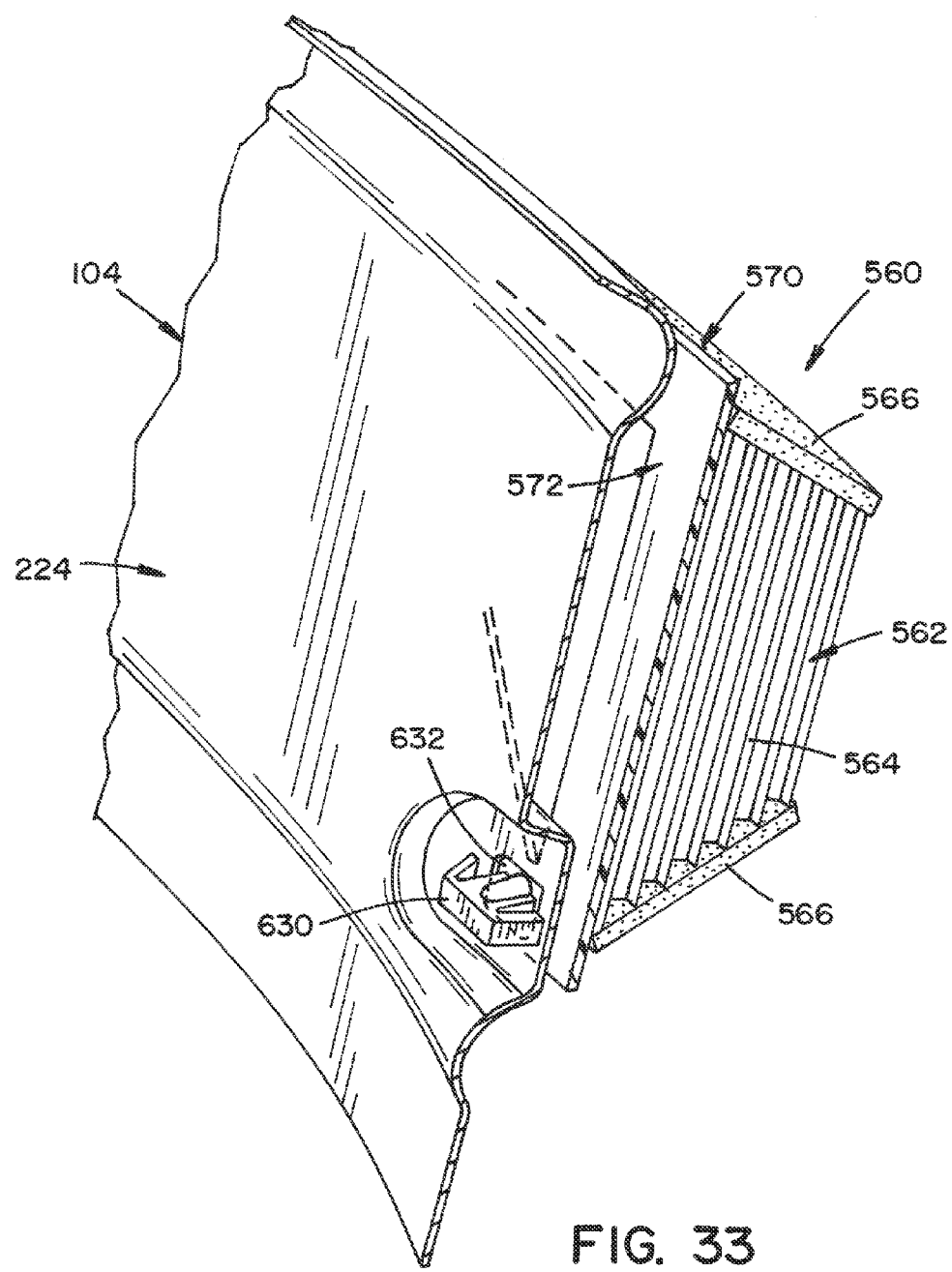
FIG. 33 is a cross-sectional perspective view of FIG. 32.

FIGS. 32 and 33 depict the reinforcement member 560 secured to a portion of the A-pillar 104. The base wall 572 of the frame 570 includes a fastener 630, such as an arrowhead fastener, that projects through an opening 632 provided on the inner panel member 224. This allows the reinforcement member 560 to be set into the A-pillar 104.

The present disclosure further provides a method of reinforcing a hollow structural member of a vehicle body comprising providing a stiffener including a honeycomb structure having a plurality of openings; securing an adhesive to the stiffener, the adhesive activatable to expand outward from the stiffener to engage a portion of an interior surface of the hollow structural member; securing a frame to the stiffener, a portion of the frame is configured to substantially conform to the shape of the inner surface of the hollow structural member; inserting the stiffener together with the frame in the hollow structural member; and providing a gap between the adhesive and the inner surface of the hollow structural member prior to activation of the adhesive. The method can further include orienting the openings of the honeycomb substantially normal to a longitudinal axis of the hollow structural member It should be appreciated from the foregoing that the use of the honeycomb structure formed of an aluminum or aluminum alloy provides high strength to the structural member while maintaining a low weight profile. The use of the adhesive as a means to cover the openings of the honeycomb structure allows the reinforcement member to maintain its low weight, by preventing e-coat buildup inside the honeycomb structure. The adhesive on the stiffener of the reinforcement member creates a barrier between the material of the stiffener and the material of the structural member with which it would otherwise have come into contact. Again, the adhesive has increased ductility for better load distribution along the entire longitudinal axis of the stiffener. By way of example, with the increased ductility, the adhesive provided on the reinforcement member can compress upon impact to the structural member, such as a side impact to the side sill. This compression of the adhesive maintains the adherence of the adhesive to the inner surface of the structural member and to the stiffener of the reinforcement member. This, in turn, allows the adhesive to distribute the impact load through the stiffener. The stiffener, which increases the load of the structural member, can then distribute the load through the structural member. The frame can also serve multiple purposes. The first is to constrain the adhesive and prevent hot flow. The second is to assemble the entire system and allow its handling without damaging the surface characteristics of the adhesive. The third is to isolate the aluminum or aluminum alloy honeycomb structure from the steel or steel alloy inner surface of the structural member to prevent galvanic corrosion. Finally, the fourth is to allow the assembly to be easily positioned within the cavity of the structural member and provide a gap between the reinforcement member and the inner surface for the flow of e-coat.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body comprising:
   a hollow structural member having an inner surface, the hollow structural member includes a first metal or metal alloy; and
   a structural reinforcement member positioned in the hollow structural member, the structural reinforcement member including:
   a stiffener including a second metal or metal alloy different from the first metal or metal alloy, wherein a gap is provided between the stiffener and the inner surface of the hollow structural member;
   an adhesive secured to the stiffener, the adhesive is substantially dry to the touch prior to activation and is activatable to expand toward the inner surface to fill at least a portion of the gap; and a frame secured to the stiffener and positioned between the stiffener and the inner surface of the hollow structural member to maintain the gap prior to expansion of the adhesive, the frame adapted to insulate the stiffener from the hollow structural member.

2. The vehicle body of claim 1, wherein the stiffener includes a honeycomb structure defining a plurality of openings, the adhesive is positioned on opposite sides of the openings of the honeycomb structure.

3. The vehicle body of claim 2, wherein the stiffener is inserted in the hollow structural member such that the plurality of openings of the honeycomb structure is oriented substantially normal to a longitudinal axis defined by the hollow structural member.

4. The vehicle body of claim 1, wherein the frame includes a base wall and opposed sidewalls moveably connected to the base wall, a portion of the frame is configured to substantially conform to the shape of the inner surface of the hollow structural member.

5. The vehicle body of claim 4, wherein a first end portion of each sidewall is hingedly connected to the base wall, and the frame further includes at least one bracket spanning between and connected to second end portions of the opposed sidewalls.

6. The vehicle body of claim 4, wherein the base wall of the frame is configured for mounting to a portion of the inner surface of the hollow structural member.

7. The vehicle body of claim 4, wherein the frame further includes a clip connected base wall by a movable member, the movable member configured to allow the clip to move away from the base wall to allow for placement of the frame on the stiffener and move the clip toward the base wall and into engagement with the stiffener.

8. The vehicle body of claim 4, wherein frame further includes a locking device for maintaining one of the opposed sidewalls in a substantially normal portion relative to the base wall.

9. The vehicle body of claim 1, wherein the honeycomb structure is formed of an aluminum or aluminum alloy and the hollow structural member is formed of a steel or steel alloy.

10. The vehicle body of claim 1, wherein the frame is formed of a reinforced plastic material, the frame providing an insulting material between the honeycomb structure and the hollow structural member to prevent galvanic corrosion.

11. The vehicle body of claim 1, wherein the hollow structural member is one of a side sill and a pillar of the vehicle body, and the inner surface of the side sill includes a longitudinally extending channel and the frame includes a projection corresponding to the shape of the channel.

12. The vehicle body of claim 1, wherein the stiffener has a first surface and a second surface oriented substantially normal to the first surface, the frame extends from the first surface to engage a first portion of the interior surface of the hollow structural member, and the adhesive is activatable to expand outward from the second surface to engage a second portion of the interior surface of the hollow structural member.

13. A structural reinforcement member for a vehicle body including a hollow structural member having an inner surface, the structural reinforcement member comprising:

a stiffener insertable in the hollow structural member with a gap between the stiffener and the inner surface, the stiffener includes a honeycomb structure having a plurality of openings, the stiffener is positioned in the hollow structural member so that the openings are oriented substantially normal to a longitudinal axis of the hollow structural member;

an adhesive secured directly to the stiffener and positioned to close opposite open ends of the plurality of openings of the honeycomb structure, the adhesive is substantially dry to the touch prior to activation and is activatable to expand toward the inner surface to fill at least a portion of the gap; and a frame secured to the stiffener and positioned between the stiffener and the inner surface of the hollow structural member to maintain the gap prior to expansion of the adhesive, a portion of the frame is configured to substantially conform to the shape of the inner surface of the hollow structural member.

14. The structural reinforcement member of claim 13, wherein the hollow structural member includes a longitudinally extending channel defined in the inner surface, the frame includes a projection which extends at least partially into the channel.

15. The structural reinforcement member of claim 14, wherein the adhesive is further secured to the frame projection and positioned between the frame and the inner surface of the hollow structural member.

16. The structural reinforcement member of claim 14, wherein the frame includes a base wall and opposed sidewall hingedly connected to the base wall, the projection is located on one of base wall and the sidewalls.

17. The structural reinforcement member of claim 13, wherein the frame further includes a clip connected thereto by a movable member, the movable member configured to allow the clip to move away from the frame to allow for placement of the frame on the stiffener and move the clip toward the frame and into engagement with the stiffener.

18. The structural reinforcement member of claim 13, wherein the frame is positioned on the stiffener substantially normal to the adhesive.

19. A method of reinforcing a hollow structural member of a vehicle comprising:
   providing a stiffener including a honeycomb structure having a plurality of openings;
   securing an adhesive to the stiffener, the adhesive activatable to expand outward from the stiffener to engage a portion of an interior surface of the hollow structural member;
   securing a frame to the stiffener, a portion of the frame is configured to substantially conform to the shape of the inner surface of the hollow structural member;
   inserting the stiffener together with the frame in the hollow structural member; and
   providing a gap between the adhesive and the inner surface of the hollow structural member prior to activation of the adhesive.

20. The method of claim 19, orienting the openings of the honeycomb structure substantially normal to a longitudinal axis of the hollow structural member.

* * * * *